(12) United States Patent
Johnsen et al.

(10) Patent No.: US 10,178,027 B2
(45) Date of Patent: Jan. 8, 2019

(54) SYSTEM AND METHOD FOR SUPPORTING INTER SUBNET PARTITIONS IN A HIGH PERFORMANCE COMPUTING ENVIRONMENT

(71) Applicant: Oracle International Corporation, Redwood Shores, CA (US)

(72) Inventors: Bjørn Dag Johnsen, Oslo (NO); Bartosz Bogdański, Oslo (NO); Line Holen, Oslo (NO)

(73) Assignee: ORACLE INTERNATIONAL CORPORATION, Redwood Shores, CA (US)

(*) Notice: Subject to any disclaimer, the term of this patent is extended or adjusted under 35 U.S.C. 154(b) by 0 days.

(21) Appl. No.: 15/413,152

(22) Filed: Jan. 23, 2017

(65) Prior Publication Data

US 2017/0214637 A1  Jul. 27, 2017

Related U.S. Application Data

(60) Provisional application No. 62/287,720, filed on Jan. 27, 2016.

(51) Int. Cl.
*H04L 12/741* (2013.01)
*H04L 29/12* (2006.01)
(Continued)

(52) U.S. Cl.
CPC .......... *H04L 45/74* (2013.01); *G06F 9/45558* (2013.01); *H04L 12/18* (2013.01); *H04L 12/185* (2013.01); *H04L 12/4641* (2013.01); *H04L 41/046* (2013.01); *H04L 41/082* (2013.01); *H04L 41/12* (2013.01); *H04L 45/02* (2013.01); *H04L 45/16* (2013.01); *H04L 45/26* (2013.01);
(Continued)

(58) Field of Classification Search
None
See application file for complete search history.

(56) References Cited

U.S. PATENT DOCUMENTS

| 6,006,090 A | 12/1999 | Coleman et al. |
| 7,277,956 B2 | 10/2007 | Horen et al. |

(Continued)

OTHER PUBLICATIONS

European Patent Office, International Searching Authority, International Search Report and Written Opinion dated Apr. 20, 2017 for International Application No. PCT/US2017/015158, 12 Pages.

(Continued)

*Primary Examiner* — Ajit Patel
(74) *Attorney, Agent, or Firm* — Tucker Ellis LLP

(57) ABSTRACT

Systems and methods for supporting inter subnet partitions in a high performance computing environment. In accordance with an embodiment, a fabric manager can define a range of P_Key values, among a plurality of P_Key values, as a inter subnet partition (ISP) P_Key range. The fabric manager can communicate this defined range of P_Key values to a number of subnets, via their subnet managers. The subnet managers in each subnet retain management over their subnets. As there is no central management that configures each side of inter subnet communication, subnet managers on within participating subnets can set up ISP membership, and then exchange information with the other subnet.

8 Claims, 21 Drawing Sheets

(51) Int. Cl.

| | | |
|---|---|---|
| *H04L 12/24* | (2006.01) | |
| *H04L 29/06* | (2006.01) | |
| *H04L 12/815* | (2013.01) | |
| *H04L 12/937* | (2013.01) | |
| *H04L 12/46* | (2006.01) | |
| *H04L 12/931* | (2013.01) | |
| *H04L 12/751* | (2013.01) | |
| *H04L 12/18* | (2006.01) | |
| *H04L 12/753* | (2013.01) | |
| *H04L 12/933* | (2013.01) | |
| *G06F 9/455* | (2018.01) | |
| *H04L 12/761* | (2013.01) | |
| *H04L 12/721* | (2013.01) | |
| *H04L 12/713* | (2013.01) | |

(52) U.S. Cl.
CPC ............ *H04L 45/48* (2013.01); *H04L 45/745* (2013.01); *H04L 47/23* (2013.01); *H04L 49/15* (2013.01); *H04L 49/253* (2013.01); *H04L 49/354* (2013.01); *H04L 49/70* (2013.01); *H04L 61/10* (2013.01); *H04L 61/2514* (2013.01); *H04L 61/35* (2013.01); *H04L 69/22* (2013.01); *G06F 2009/45595* (2013.01); *H04L 45/586* (2013.01); *H04L 61/6004* (2013.01); *H04L 61/6059* (2013.01); *H04L 61/6068* (2013.01); *H04L 63/02* (2013.01)

(56) References Cited

U.S. PATENT DOCUMENTS

| | | | |
|---|---|---|---|
| 7,373,660 B1 | 5/2008 | Guichard et al. | |
| 7,409,432 B1* | 8/2008 | Recio | H04L 41/12 370/254 |
| 7,483,442 B1* | 1/2009 | Torudbaken | H04L 49/15 370/360 |
| 7,983,265 B1* | 7/2011 | Dropps | H04L 12/66 370/392 |
| 8,009,589 B2 | 8/2011 | Burrow et al. | |
| 8,009,693 B2 | 8/2011 | Liao | |
| 8,713,649 B2 | 4/2014 | Johnsen et al. | |
| 8,775,713 B2 | 7/2014 | Chandra et al. | |
| 9,219,718 B2 | 12/2015 | Johnsen | |
| 2003/0023896 A1 | 1/2003 | Kashyap | |
| 2003/0061379 A1* | 3/2003 | Craddock | H04L 45/00 709/238 |
| 2003/0093627 A1 | 5/2003 | Neal | |
| 2003/0103455 A1* | 6/2003 | Pinto | H04L 45/02 370/230 |
| 2004/0022245 A1* | 2/2004 | Forbes | H04L 45/04 370/392 |
| 2004/0024903 A1* | 2/2004 | Costatino | H04L 45/00 709/238 |
| 2004/0030763 A1* | 2/2004 | Manter | H04L 41/044 709/223 |
| 2004/0062266 A1* | 4/2004 | Rojas | H04L 47/10 370/447 |
| 2004/0190546 A1 | 9/2004 | Jackson | |
| 2005/0060445 A1* | 3/2005 | Beukema | H04L 47/30 710/52 |
| 2005/0071472 A1 | 3/2005 | Arndt et al. | |
| 2005/0144313 A1* | 6/2005 | Arndt | H04L 12/18 709/238 |
| 2006/0006905 A1 | 1/2006 | Chou et al. | |
| 2006/0056424 A1 | 3/2006 | Lih et al. | |
| 2006/0230219 A1* | 10/2006 | Njoku | G06F 13/102 710/316 |
| 2008/0095160 A1 | 4/2008 | Yadav et al. | |
| 2009/0216853 A1 | 8/2009 | Burrow et al. | |
| 2010/0214952 A1 | 8/2010 | Gallagher et al. | |
| 2012/0307682 A1 | 12/2012 | Johnsen et al. | |
| 2012/0311682 A1 | 12/2012 | Johnsen et al. | |
| 2013/0121149 A1 | 5/2013 | Guay et al. | |
| 2013/0121154 A1* | 5/2013 | Guay | H04L 45/125 370/236 |
| 2013/0166798 A1 | 6/2013 | Chandra et al. | |
| 2013/0254321 A1 | 9/2013 | Johnsen et al. | |
| 2013/0266009 A1 | 10/2013 | Colloff et al. | |
| 2013/0301646 A1* | 11/2013 | Bogdanski | H04L 49/253 370/401 |
| 2014/0177639 A1 | 6/2014 | Vershkov et al. | |
| 2014/0269686 A1 | 9/2014 | Srinivasan et al. | |
| 2014/0362709 A1* | 12/2014 | Kashyap | H04L 41/12 370/250 |
| 2015/0030034 A1 | 1/2015 | Bogdanski et al. | |
| 2015/0098466 A1 | 4/2015 | Haramaty et al. | |
| 2015/0338909 A1 | 11/2015 | Woodruff | |
| 2016/0013973 A1 | 1/2016 | Onoue | |
| 2017/0214537 A1 | 7/2017 | Johnsen et al. | |
| 2017/0230257 A1* | 8/2017 | Bruun | H04L 41/5054 |
| 2017/0339106 A1* | 11/2017 | Rimmer | H04L 63/0236 |

OTHER PUBLICATIONS

United States Patent and Trademark Office, Office Action dated Apr. 12, 2018 for U.S. Appl. No. 15/413,149, 12 Pages.

United States Patent and Trademark Office, Office Action dated Apr. 17, 2018 for U.S. Appl. No. 15/414,196, 15 Pages.

United States Patent and Trademark Office, Office Action dated May 16, 2018 for U.S. Appl. No. 15/415,576, 12 Pages.

United States Patent and Trademark Office, Office Action dated Jun. 12, 2018 for U.S. Appl. No. 15/415,517, 35 Pages.

\* cited by examiner

SYSTEM AND METHOD FOR SUPPORTING INTER SUBNET PARTITIONS IN A HIGH PERFORMANCE COMPUTING ENVIRONMENT

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

CLAIM OF PRIORITY AND CROSS REFERENCE TO RELATED APPLICATIONS

This application claims the benefit of priority to U.S. Provisional Patent Application entitled "SYSTEM AND METHOD FOR USING MULTIPLE LIDS PER VIRTUAL ROUTER PORT IN ORDER TO UTILIZE SWITCH LFT BASED FORWARDING FOR BOTH LOCAL ROUTER PORT AND REMOTE TRAFFIC", Application No. 62/287,720, filed on Jan. 27, 2016, which is incorporated by reference in its entirety.

FIELD OF INVENTION

The present invention is generally related to computer systems, and is particularly related to supporting inter subnet partitions in a high performance computing environment.

BACKGROUND

As larger cloud computing architectures are introduced, the performance and administrative bottlenecks associated with the traditional network and storage have become a significant problem. There has been an increased interest in using high performance lossless interconnects such as InfiniBand (IB) technology as the foundation for a cloud computing fabric. This is the general area that embodiments of the invention are intended to address.

SUMMARY

Described herein are methods and systems for supporting inter subnet partitions in a high performance computing environment. An exemplary method can provide, at one or more computers, including one or more microprocessors, a first subnet, the first subnet comprising a plurality of switches, the plurality of switches comprising at least a leaf switch, wherein each of the plurality of switches comprise a plurality of switch ports, a plurality of host channel adapters, each host channel adapter comprising at least one host channel adapter port, a plurality of end nodes, wherein each of the end nodes are associated with at least one host channel adapter of the plurality of host channel adapters, and a subnet manager, the subnet manager running on one of the plurality of switches and the plurality of host channel adapters. The method can provide, at the one or more computers, including the one or more microprocessors, a fabric manager, the fabric manager residing in the high performance computing environment. The method can configure, a switch port of the plurality of switch ports on a switch of the plurality of switches as a router port. The method can logically connect the switch port configured as the router port to a virtual router, the virtual router comprising at least two virtual router ports. The method can define, by the fabric manager, a range of partition key (P_Key) values within a plurality of partition key values, the defined range of partition key values comprising an Inter Subnet Partition (ISP) P_Key range. The method can communicate, by the fabric manager, the ISP P_Key range to the subnet manager.

In accordance with an embodiment, one or more of the plurality of host channel adapters (either of the first or second subnet) can comprise at least one virtual function, at least one virtual switch, and at least one physical function. The plurality of end nodes (of the first or second subnet) can comprise physical hosts, virtual machines, or a combination of physical hosts and virtual machines, wherein the virtual machines are associated with at least one virtual function.

DETAILED DESCRIPTION

Figure 1:
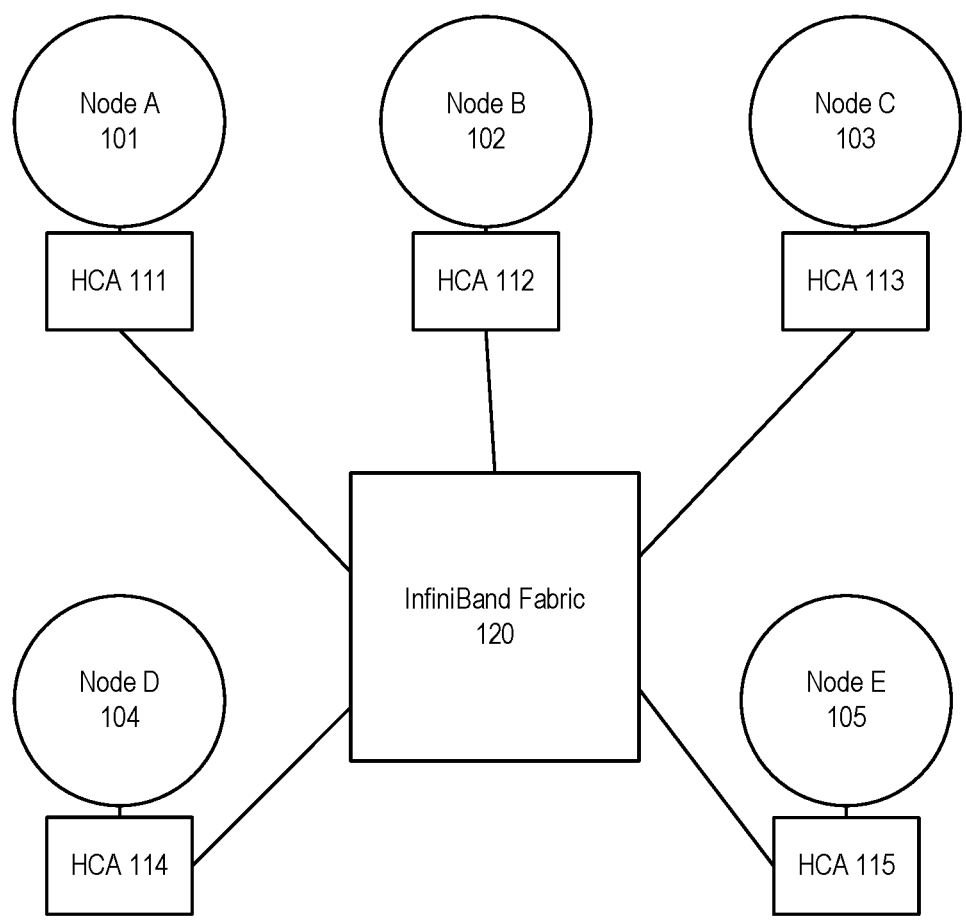
FIG. 1 shows an illustration of an InfiniBand environment, in accordance with an embodiment.

The invention is illustrated, by way of example and not by way of limitation, in the figures of the accompanying drawings in which like references indicate similar elements. It should be noted that references to "an" or "one" or "some" embodiment(s) in this disclosure are not necessarily to the same embodiment, and such references mean at least one. While specific implementations are discussed, it is understood that the specific implementations are provided for illustrative purposes only. A person skilled in the relevant art will recognize that other components and configurations may be used without departing from the scope and spirit of the invention.

Common reference numerals can be used to indicate like elements throughout the drawings and detailed description; therefore, reference numerals used in a figure may or may not be referenced in the detailed description specific to such figure if the element is described elsewhere.

Described herein are systems and methods to support inter subnet partitions in a high performance computing environment.

The following description of the invention uses an InfiniBand™ (IB) network as an example for a high performance network. Throughout the following description, reference can be made to the InfiniBand™ specification (also referred to variously as the InfiniBand specification, IB specification, or the legacy IB specification). Such reference is understood to refer to the InfiniBand® Trade Association Architecture Specification, Volume 1, Version 1.3, released March, 2015, available at http://www.inifinibandta.org, which is herein incorporated by reference in its entirety. It will be apparent to those skilled in the art that other types of high performance networks can be used without limitation. The following description also uses the fat-tree topology as an example for a fabric topology. It will be apparent to those skilled in the art that other types of fabric topologies can be used without limitation.

To meet the demands of the cloud in the current era (e.g., Exascale era), it is desirable for virtual machines to be able to utilize low overhead network communication paradigms such as Remote Direct Memory Access (RDMA). RDMA bypasses the OS stack and communicates directly with the hardware, thus, pass-through technology like Single-Root I/O Virtualization (SR-IOV) network adapters can be used. In accordance with an embodiment, a virtual switch (vSwitch) SR-IOV architecture can be provided for applicability in high performance lossless interconnection networks. As network reconfiguration time is critical to make live-migration a practical option, in addition to network architecture, a scalable and topology-agnostic dynamic reconfiguration mechanism can be provided.

In accordance with an embodiment, and furthermore, routing strategies for virtualized environments using vSwitches can be provided, and an efficient routing algorithm for network topologies (e.g., Fat-Tree topologies) can be provided. The dynamic reconfiguration mechanism can be further tuned to minimize imposed overhead in Fat-Trees.

In accordance with an embodiment of the invention, virtualization can be beneficial to efficient resource utilization and elastic resource allocation in cloud computing. Live migration makes it possible to optimize resource usage by moving virtual machines (VMs) between physical servers in an application transparent manner. Thus, virtualization can enable consolidation, on-demand provisioning of resources, and elasticity through live migration.

InfiniBand™

InfiniBand™ (IB) is an open standard lossless network technology developed by the InfiniBand™ Trade Association. The technology is based on a serial point-to-point full-duplex interconnect that offers high throughput and low latency communication, geared particularly towards high-performance computing (HPC) applications and datacenters.

The InfiniBand™ Architecture (IBA) supports a two-layer topological division. At the lower layer, IB networks are referred to as subnets, where a subnet can include a set of hosts interconnected using switches and point-to-point links. At the higher level, an IB fabric constitutes one or more subnets, which can be interconnected using routers.

Within a subnet, hosts can be connected using switches and point-to-point links. Additionally, there can be a master management entity, the subnet manager (SM), which resides on a designated device in the subnet. The subnet manager is responsible for configuring, activating and maintaining the IB subnet. Additionally, the subnet manager (SM) can be responsible for performing routing table calculations in an IB fabric. Here, for example, the routing of the IB network aims at proper load balancing between all source and destination pairs in the local subnet.

Through the subnet management interface, the subnet manager exchanges control packets, which are referred to as subnet management packets (SMPs), with subnet management agents (SMAs). The subnet management agents reside on every IB subnet device. By using SMPs, the subnet manager is able to discover the fabric, configure end nodes and switches, and receive notifications from SMAs.

In accordance with an embodiment, intra-subnet routing in an IB network can be based on linear forwarding tables (LFTs) stored in the switches. The LFTs are calculated by the SM according to the routing mechanism in use. In a subnet, Host Channel Adapter (HCA) ports on the end nodes and switches are addressed using local identifiers (LIDs). Each entry in a linear forwarding table (LFT) consists of a destination LID (DLID) and an output port. Only one entry per LID in the table is supported. When a packet arrives at a switch, its output port is determined by looking up the DLID in the forwarding table of the switch. The routing is deterministic as packets take the same path in the network between a given source-destination pair (LID pair).

Generally, all other subnet managers, excepting the master subnet manager, act in standby mode for fault-tolerance. In a situation where a master subnet manager fails, however, a new master subnet manager is negotiated by the standby subnet managers. The master subnet manager also performs periodic sweeps of the subnet to detect any topology changes and reconfigure the network accordingly.

Furthermore, hosts and switches within a subnet can be addressed using local identifiers (LIDs), and a single subnet can be limited to 49151 unicast LIDs. Besides the LIDs, which are the local addresses that are valid within a subnet, each IB device can have a 64-bit global unique identifier (GUID). A GUID can be used to form a global identifier (GID), which is an IB layer three (L3) address.

The SM can calculate routing tables (i.e., the connections/routes between each pair of nodes within the subnet) at network initialization time. Furthermore, the routing tables can be updated whenever the topology changes, in order to ensure connectivity and optimal performance. During normal operations, the SM can perform periodic light sweeps of the network to check for topology changes. If a change is discovered during a light sweep or if a message (trap) signaling a network change is received by the SM, the SM can reconfigure the network according to the discovered changes.

For example, the SM can reconfigure the network when the network topology changes, such as when a link goes down, when a device is added, or when a link is removed. The reconfiguration steps can include the steps performed during the network initialization. Furthermore, the reconfigurations can have a local scope that is limited to the subnets, in which the network changes occurred. Also, the segmenting of a large fabric with routers may limit the reconfiguration scope.

An example InfiniBand fabric is shown in FIG. 1, which shows an illustration of an InfiniBand environment 100, in accordance with an embodiment. In the example shown in FIG. 1, nodes A-E, 101-105, use the InfiniBand fabric, 120, to communicate, via the respective host channel adapters 111-115. In accordance with an embodiment, the various nodes, e.g., nodes A-E, 101-105, can be represented by various physical devices. In accordance with an embodiment, the various nodes, e.g., nodes A-E, 101-105, can be represented by various virtual devices, such as virtual machines.

Partitioning in InfiniBand

In accordance with an embodiment, IB networks can support partitioning as a security mechanism to provide for isolation of logical groups of systems sharing a network fabric. Each HCA port on a node in the fabric can be a member of one or more partitions. Partition memberships are managed by a centralized partition manager, which can be part of the SM. The SM can configure partition membership information on each port as a table of 16-bit partition keys (P_Keys). The SM can also configure switch and router ports with the partition enforcement tables containing P_Key information associated with the end-nodes that send or receive data traffic through these ports. Additionally, in a general case, partition membership of a switch port can represent a union of all membership indirectly associated with LIDs routed via the port in an egress (towards the link) direction.

In accordance with an embodiment, partitions are logical groups of ports such that the members of a group can only communicate to other members of the same logical group. At host channel adapters (HCAs) and switches, packets can be filtered using the partition membership information to enforce isolation. Packets with invalid partitioning information can be dropped as soon as the packets reaches an incoming port. In partitioned IB systems, partitions can be used to create tenant clusters. With partition enforcement in place, a node cannot communicate with other nodes that belong to a different tenant cluster. In this way, the security of the system can be guaranteed even in the presence of compromised or malicious tenant nodes.

In accordance with an embodiment, for the communication between nodes, Queue Pairs (QPs) and End-to-End contexts (EECs) can be assigned to a particular partition, except for the management Queue Pairs (QP0 and QP1). The P_Key information can then be added to every IB transport packet sent. When a packet arrives at an HCA port or a switch, its P_Key value can be validated against a table configured by the SM. If an invalid P_Key value is found, the packet is discarded immediately. In this way, communication is allowed only between ports sharing a partition.

Figure 2:
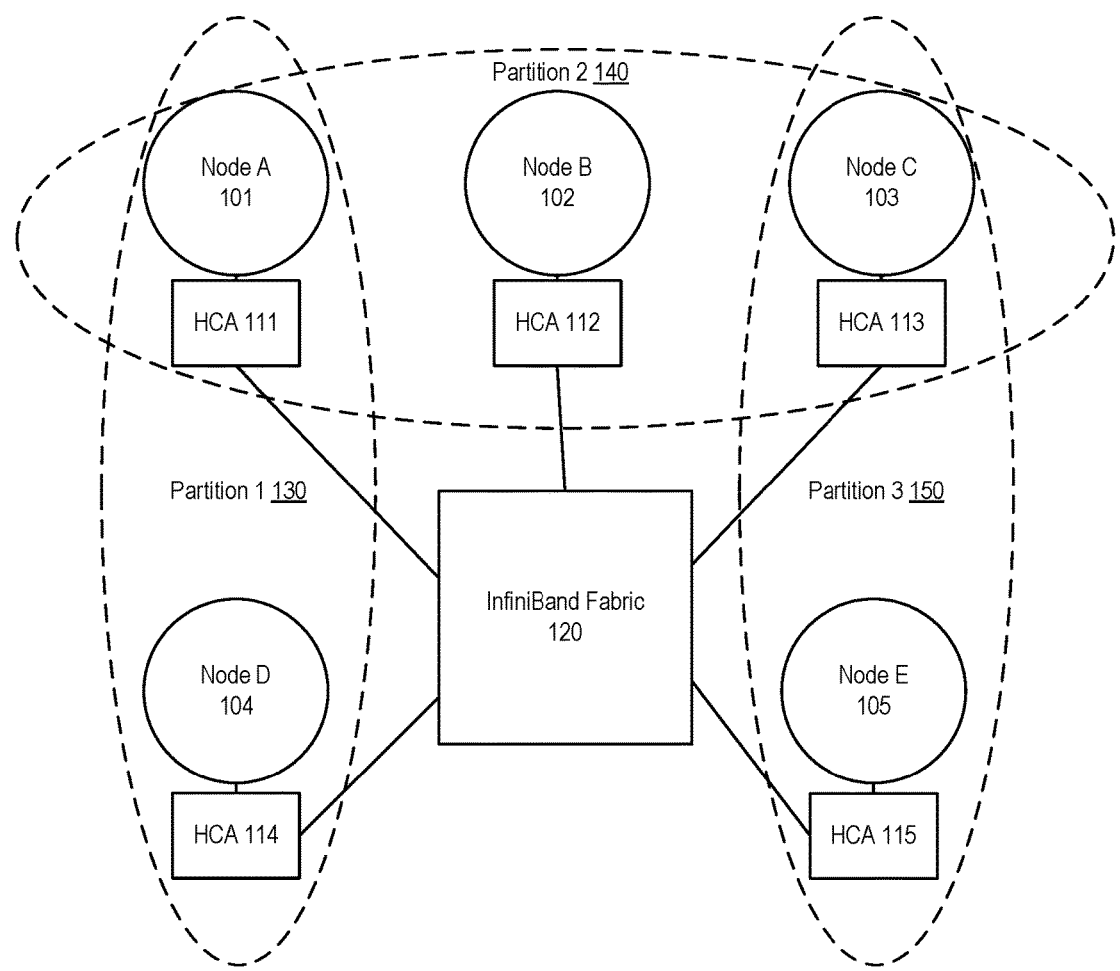
FIG. 2 shows an illustration of a partitioned cluster environment, in accordance with an embodiment

An example of IB partitions is shown in FIG. 2, which shows an illustration of a partitioned cluster environment, in accordance with an embodiment. In the example shown in FIG. 2, nodes A-E, 101-105, use the InfiniBand fabric, 120, to communicate, via the respective host channel adapters 111-115. The nodes A-E are arranged into partitions, namely partition 1, 130, partition 2, 140, and partition 3, 150. Partition 1 comprises node A 101 and node D 104. Partition 2 comprises node A 101, node B 102, and node C 103. Partition 3 comprises node C 103 and node E 105. Because of the arrangement of the partitions, node D 104 and node E 105 are not allowed to communicate as these nodes do not share a partition. Meanwhile, for example, node A 101 and node C 103 are allowed to communicate as these nodes are both members of partition 2, 140.

Virtual Machines in InfiniBand

During the last decade, the prospect of virtualized High Performance Computing (HPC) environments has improved considerably as CPU overhead has been practically removed through hardware virtualization support; memory overhead has been significantly reduced by virtualizing the Memory Management Unit; storage overhead has been reduced by the use of fast SAN storages or distributed networked file systems; and network I/O overhead has been reduced by the use of device passthrough techniques like Single Root Input/Output Virtualization (SR-IOV). It is now possible for clouds to accommodate virtual HPC (vHPC) clusters using high performance interconnect solutions and deliver the necessary performance.

However, when coupled with lossless networks, such as InfiniBand (IB), certain cloud functionality, such as live migration of virtual machines (VMs), still remains an issue due to the complicated addressing and routing schemes used in these solutions. IB is an interconnection network technology offering high bandwidth and low latency, thus, is very well suited for HPC and other communication intensive workloads.

The traditional approach for connecting IB devices to VMs is by utilizing SR-IOV with direct assignment. However, achieving live migration of VMs assigned with IB Host Channel Adapters (HCAs) using SR-IOV has proved to be challenging. Each IB connected node has three different addresses: LID, GUID, and GID. When a live migration happens, one or more of these addresses change. Other nodes communicating with the VM-in-migration can lose connectivity. When this happens, the lost connection can be attempted to be renewed by locating the virtual machine's new address to reconnect to by sending Subnet Administration (SA) path record queries to the IB Subnet Manager (SM).

IB uses three different types of addresses. A first type of address is the 16 bits Local Identifier (LID). At least one unique LID is assigned to each HCA port and each switch by the SM. The LIDs are used to route traffic within a subnet. Since the LID is 16 bits long, 65536 unique address combinations can be made, of which only 49151 (0x0001-0xBFFF) can be used as unicast addresses. Consequently, the number of available unicast addresses defines the maximum size of an IB subnet. A second type of address is the 64 bits Global Unique Identifier (GUID) assigned by the manufacturer to each device (e.g. HCAs and switches) and each HCA port. The SM may assign additional subnet unique GUIDs to an HCA port, which is useful when SR-IOV is used. A third type of address is the 128 bits Global Identifier (GID). The GID is a valid IPv6 unicast address, and at least one is assigned to each HCA port. The GID is formed by combining a globally unique 64 bits prefix assigned by the fabric administrator, and the GUID address of each HCA port.

Fat-Tree (FTree) Topologies and Routing

In accordance with an embodiment, some of the IB based HPC systems employ a fat-tree topology to take advantage of the useful properties fat-trees offer. These properties include full bisection-bandwidth and inherent fault-tolerance due to the availability of multiple paths between each source destination pair. The initial idea behind fat-trees was to employ fatter links between nodes, with more available bandwidth, as the tree moves towards the roots of the topology. The fatter links can help to avoid congestion in the upper-level switches and the bisection-bandwidth is maintained.

Figure 3:
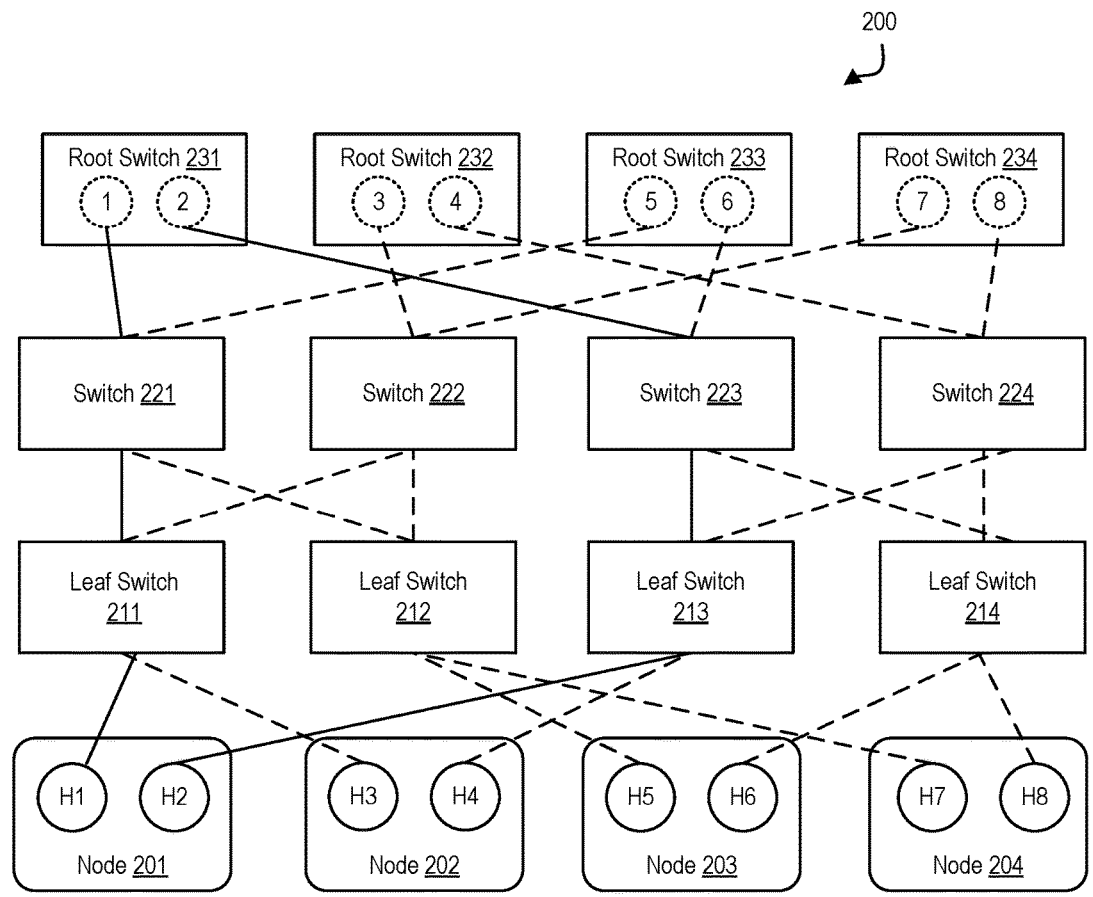
FIG. 3 shows an illustration of a tree topology in a network environment, in accordance with an embodiment.

FIG. 3 shows an illustration of a tree topology in a network environment, in accordance with an embodiment. As shown in FIG. 3, one or more end nodes 201-204 can be connected in a network fabric 200. The network fabric 200 can be based on a fat-tree topology, which includes a plurality of leaf switches 211-214, and multiple spine switches or root switches 231-234. Additionally, the network fabric 200 can include one or more intermediate switches, such as switches 221-224.

Also as shown in FIG. 3, each of the end nodes 201-204 can be a multi-homed node, i.e., a single node that is connected to two or more parts of the network fabric 200 through multiple ports. For example, the node 201 can include the ports H1 and H2, the node 202 can include the ports H3 and H4, the node 203 can include the ports H5 and H6, and the node 204 can include the ports H7 and H8.

Additionally, each switch can have multiple switch ports. For example, the root switch 231 can have the switch ports 1-2, the root switch 232 can have the switch ports 3-4, the root switch 233 can have the switch ports 5-6, and the root switch 234 can have the switch ports 7-8.

In accordance with an embodiment, the fat-tree routing mechanism is one of the most popular routing algorithm for IB based fat-tree topologies. The fat-tree routing mechanism is also implemented in the OFED (Open Fabric Enterprise Distribution—a standard software stack for building and deploying IB based applications) subnet manager, OpenSM.

The fat-tree routing mechanism aims to generate LFTs that evenly spread shortest-path routes across the links in the network fabric. The mechanism traverses the fabric in the indexing order and assigns target LIDs of the end nodes, and thus the corresponding routes, to each switch port. For the end nodes connected to the same leaf switch, the indexing order can depend on the switch port to which the end node is connected (i.e., port numbering sequence). For each port, the mechanism can maintain a port usage counter, and can use this port usage counter to select a least-used port each time a new route is added.

In accordance with an embodiment, in a partitioned subnet, nodes that are not members of a common partition are not allowed to communicate. Practically, this means that some of the routes assigned by the fat-tree routing algorithm are not used for the user traffic. The problem arises when the fat tree routing mechanism generates LFTs for those routes the same way it does for the other functional paths. This behavior can result in degraded balancing on the links, as nodes are routed in the order of indexing. As routing can be performed oblivious to the partitions, fat-tree routed subnets, in general, provide poor isolation among partitions.

In accordance with an embodiment, a Fat-Tree is a hierarchical network topology that can scale with the available network resources. Moreover, Fat-Trees are easy to build using commodity switches placed on different levels of the hierarchy. Different variations of Fat-Trees are commonly available, including k-ary-n-trees, Extended Generalized Fat-Trees (XGFTs), Parallel Ports Generalized Fat-Trees (PGFTs) and Real Life Fat-Trees (RLFTs).

A k-ary-n-tree is an n level Fat-Tree with $k^n$ end nodes and $n \cdot k^{n-1}$ switches, each with 2 k ports. Each switch has an equal number of up and down connections in the tree. XGFT Fat-Tree extends k-ary-n-trees by allowing both different number of up and down connections for the switches, and different number of connections at each level in the tree. The PGFT definition further broadens the XGFT topologies and permits multiple connections between switches. A large variety of topologies can be defined using XGFTs and PGFTs. However, for practical purposes, RLFT, which is a restricted version of PGFT, is introduced to define Fat-Trees commonly found in today's HPC clusters. An RLFT uses the same port-count switches at all levels in the Fat-Tree.

Input/Output (I/O) Virtualization

In accordance with an embodiment, I/O Virtualization (IOV) can provide availability of I/O by allowing virtual machines (VMs) to access the underlying physical resources. The combination of storage traffic and inter-server communication impose an increased load that may overwhelm the I/O resources of a single server, leading to backlogs and idle processors as they are waiting for data. With the increase in number of I/O requests, IOV can provide availability; and can improve performance, scalability and flexibility of the (virtualized) I/O resources to match the level of performance seen in modern CPU virtualization.

In accordance with an embodiment, IOV is desired as it can allow sharing of I/O resources and provide protected access to the resources from the VMs. IOV decouples a logical device, which is exposed to a VM, from its physical implementation. Currently, there can be different types of IOV technologies, such as emulation, paravirtualization, direct assignment (DA), and single root-I/O virtualization (SR-IOV).

In accordance with an embodiment, one type of IOV technology is software emulation. Software emulation can allow for a decoupled front-end/back-end software architecture. The front-end can be a device driver placed in the VM, communicating with the back-end implemented by a hypervisor to provide I/O access. The physical device sharing ratio is high and live migrations of VMs are possible with just a few milliseconds of network downtime. However, software emulation introduces additional, undesired computational overhead.

In accordance with an embodiment, another type of IOV technology is direct device assignment. Direct device assignment involves a coupling of I/O devices to VMs, with no device sharing between VMs. Direct assignment, or device passthrough, provides near to native performance with minimum overhead. The physical device bypasses the hypervisor and is directly attached to the VM. However, a downside of such direct device assignment is limited scalability, as there is no sharing among virtual machines—one physical network card is coupled with one VM.

In accordance with an embodiment, Single Root IOV (SR-IOV) can allow a physical device to appear through hardware virtualization as multiple independent lightweight instances of the same device. These instances can be assigned to VMs as passthrough devices, and accessed as Virtual Functions (VFs). The hypervisor accesses the device through a unique (per device), fully featured Physical Function (PF). SR-IOV eases the scalability issue of pure direct assignment. However, a problem presented by SR-IOV is that it can impair VM migration. Among these IOV technologies, SR-IOV can extend the PCI Express (PCIe) specification with the means to allow direct access to a single physical device from multiple VMs while maintaining near to native performance. Thus, SR-IOV can provide good performance and scalability.

SR-IOV allows a PCIe device to expose multiple virtual devices that can be shared between multiple guests by allocating one virtual device to each guest. Each SR-IOV device has at least one physical function (PF) and one or more associated virtual functions (VF). A PF is a normal PCIe function controlled by the virtual machine monitor (VMM), or hypervisor, whereas a VF is a light-weight PCIe function. Each VF has its own base address (BAR) and is assigned with a unique requester ID that enables I/O memory management unit (IOMMU) to differentiate between the traffic streams to/from different VFs. The IOMMU also apply memory and interrupt translations between the PF and the VFs.

Unfortunately, however, direct device assignment techniques pose a barrier for cloud providers in situations where transparent live migration of virtual machines is desired for data center optimization. The essence of live migration is that the memory contents of a VM are copied to a remote hypervisor. Then the VM is paused at the source hypervisor, and the VM's operation is resumed at the destination. When using software emulation methods, the network interfaces are virtual so their internal states are stored into the memory and get copied as well. Thus the downtime could be brought down to a few milliseconds.

However, migration becomes more difficult when direct device assignment techniques, such as SR-IOV, are used. In such situations, a complete internal state of the network interface cannot be copied as it is tied to the hardware. The SR-IOV VFs assigned to a VM are instead detached, the live migration will run, and a new VF will be attached at the destination. In the case of InfiniBand and SR-IOV, this process can introduce downtime in the order of seconds. Moreover, in an SR-IOV shared port model the addresses of the VM will change after the migration, causing additional overhead in the SM and a negative impact on the performance of the underlying network fabric.

InfiniBand SR-IOV Architecture—Shared Port

There can be different types of SR-IOV models, e.g. a shared port model, a virtual switch model, and a virtual port model.

Figure 4:
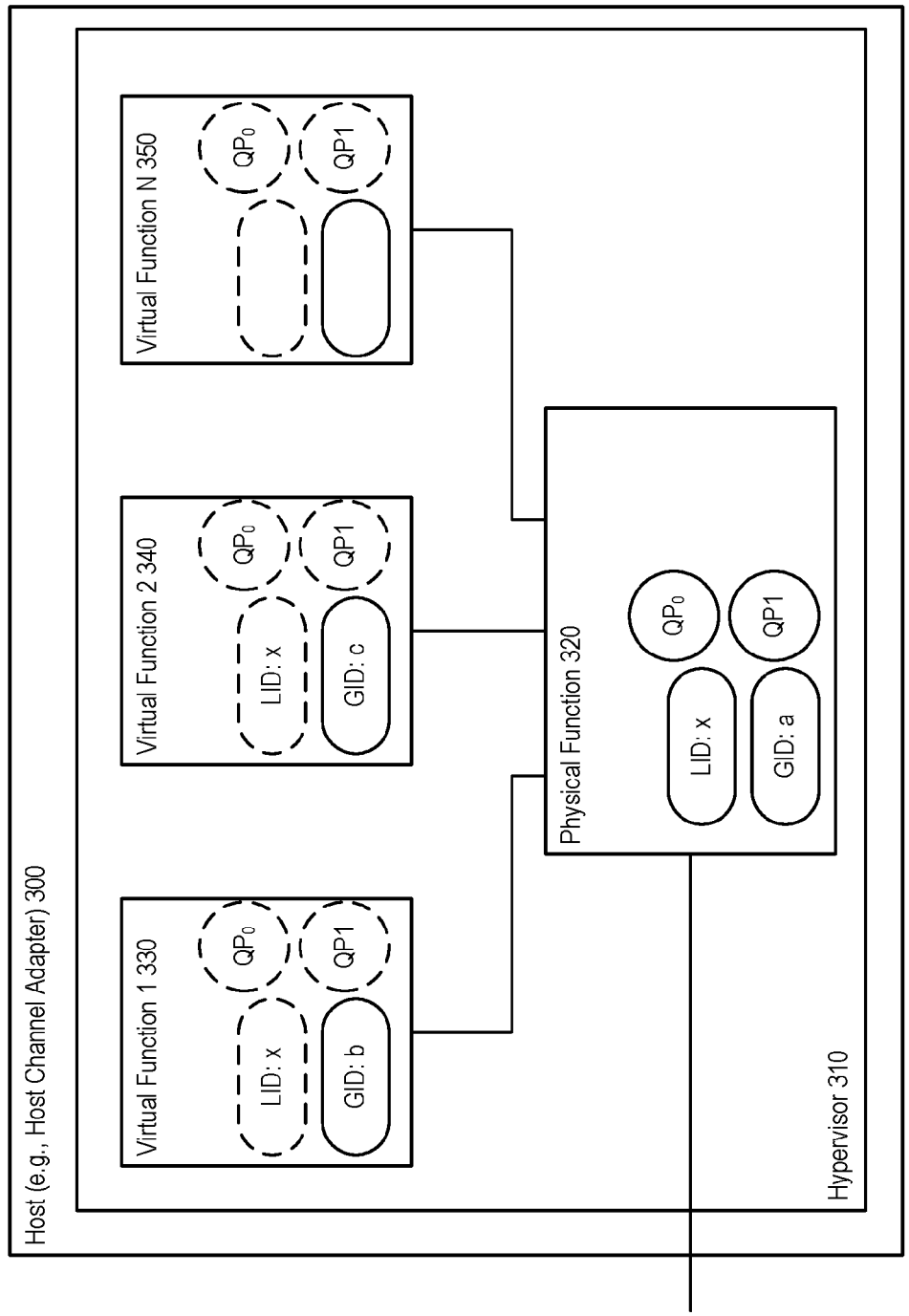
FIG. 4 shows an exemplary shared port architecture, in accordance with an embodiment.

FIG. 4 shows an exemplary shared port architecture, in accordance with an embodiment. As depicted in the figure, a host 300 (e.g., a host channel adapter) can interact with a hypervisor 310, which can assign the various virtual functions 330, 340, 350, to a number of virtual machines. As well, the physical function can be handled by the hypervisor 310.

In accordance with an embodiment, when using a shared port architecture, such as that depicted in FIG. 4, the host, e.g., HCA, appears as a single port in the network with a single shared LID and shared Queue Pair (QP) space between the physical function 320 and the virtual functions 330, 350, 350. However, each function (i.e., physical function and virtual functions) can have their own GID.

As shown in FIG. 4, in accordance with an embodiment, different GIDs can be assigned to the virtual functions and the physical function, and the special queue pairs, QP0 and QP1 (i.e., special purpose queue pairs that are used for InfiniBand management packets), are owned by the physical function. These QPs are exposed to the VFs as well, but the VFs are not allowed to use QP0 (all SMPs coming from VFs towards QP0 are discarded), and QP1 can act as a proxy of the actual QP1 owned by the PF.

In accordance with an embodiment, the shared port architecture can allow for highly scalable data centers that are not limited by the number of VMs (which attach to the network by being assigned to the virtual functions), as the LID space is only consumed by physical machines and switches in the network.

However, a shortcoming of the shared port architecture is the inability to provide transparent live migration, hindering the potential for flexible VM placement. As each LID is associated with a specific hypervisor, and shared among all VMs residing on the hypervisor, a migrating VM (i.e., a virtual machine migrating to a destination hypervisor) has to have its LID changed to the LID of the destination hypervisor. Furthermore, as a consequence of the restricted QP0 access, a subnet manager cannot run inside a VM.

InfiniBand SR-IOV Architecture Models—Virtual Switch (vSwitch)

Figure 5:
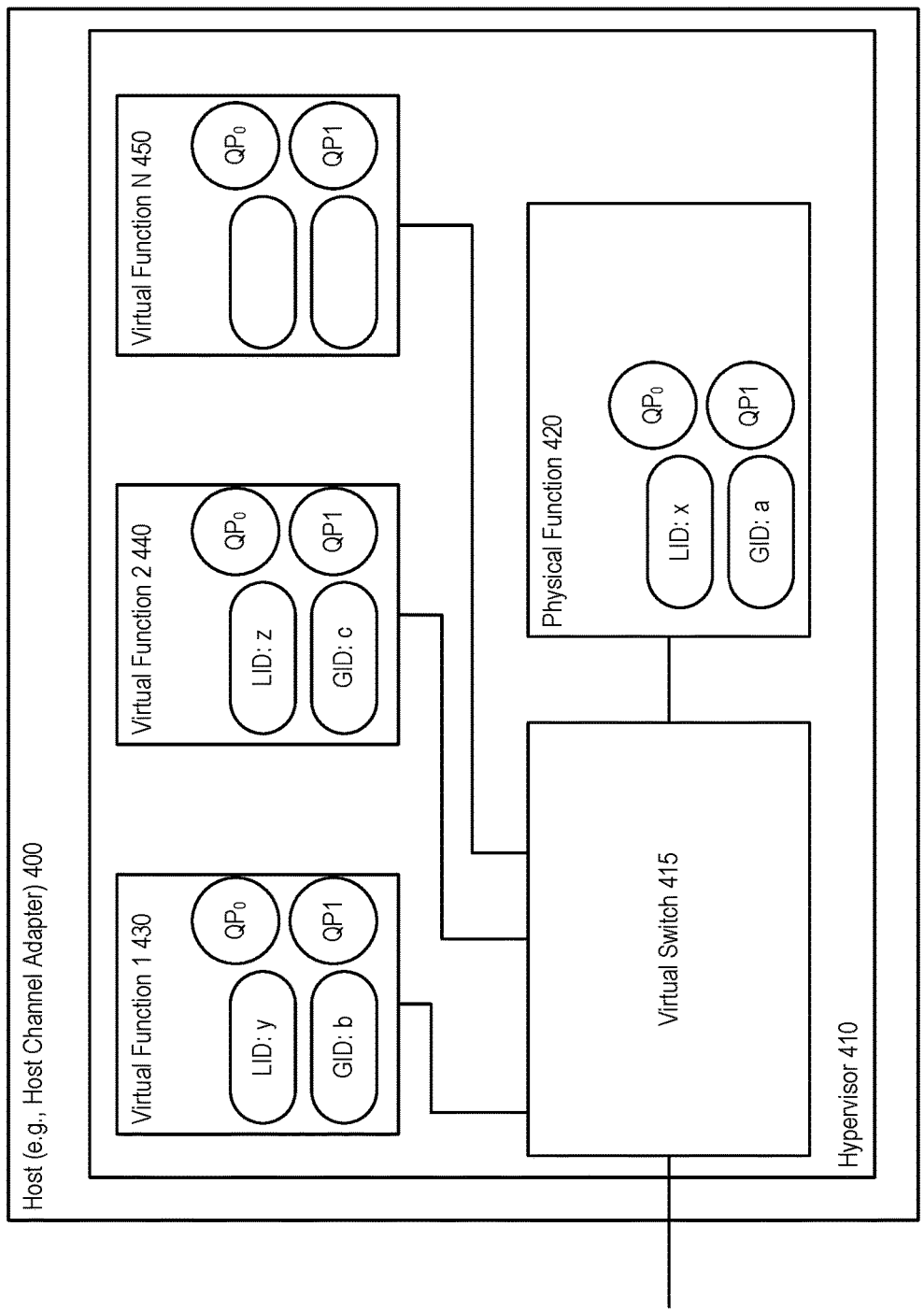
FIG. 5 shows an exemplary vSwitch architecture, in accordance with an embodiment.

FIG. 5 shows an exemplary vSwitch architecture, in accordance with an embodiment. As depicted in the figure, a host 400 (e.g., a host channel adapter) can interact with a hypervisor 410, which can assign the various virtual functions 430, 440, 450, to a number of virtual machines. As well, the physical function can be handled by the hypervisor 410. A virtual switch 415 can also be handled by the hypervisor 401.

In accordance with an embodiment, in a vSwitch architecture each virtual function 430, 440, 450 is a complete virtual Host Channel Adapter (vHCA), meaning that the VM assigned to a VF is assigned a complete set of IB addresses (e.g., GID, GUID, LID) and a dedicated QP space in the hardware. For the rest of the network and the SM, the HCA 400 looks like a switch, via the virtual switch 415, with additional nodes connected to it. The hypervisor 410 can use the PF 420, and the VMs (attached to the virtual functions) use the VFs.

In accordance with an embodiment, a vSwitch architecture provide transparent virtualization. However, because each virtual function is assigned a unique LID, the number of available LIDs gets consumed rapidly. As well, with many LID addresses in use (i.e., one each for each physical function and each virtual function), more communication paths have to be computed by the SM and more Subnet Management Packets (SMPs) have to be sent to the switches in order to update their LFTs. For example, the computation of the communication paths might take several minutes in large networks. Because LID space is limited to 49151 unicast LIDs, and as each VM (via a VF), physical node, and switch occupies one LID each, the number of physical nodes and switches in the network limits the number of active VMs, and vice versa.

InfiniBand SR-IOV Architecture Models—Virtual Port (vPort)

Figure 6:
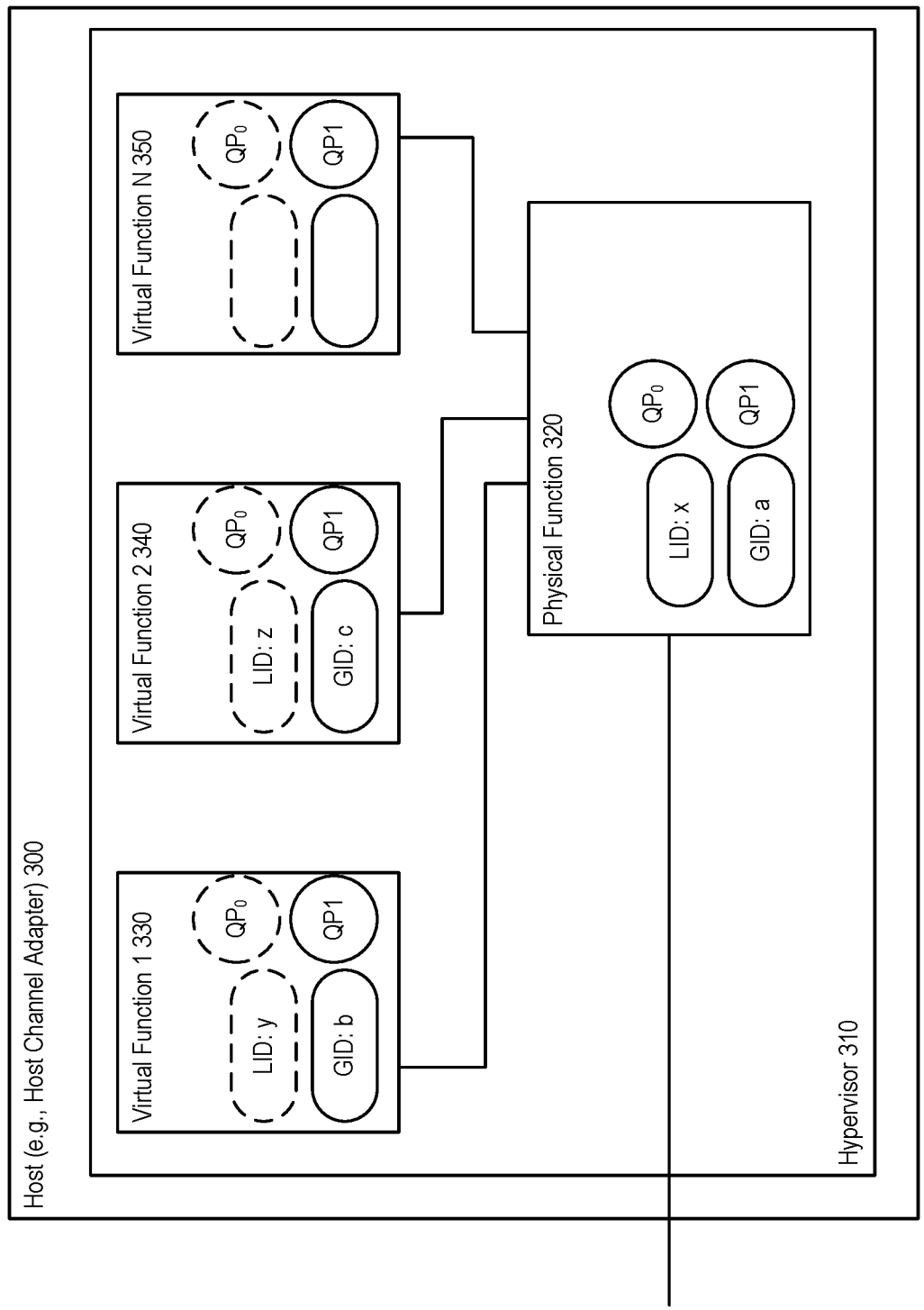
FIG. 6 shows an exemplary vPort architecture, in accordance with an embodiment.

FIG. 6 shows an exemplary vPort concept, in accordance with an embodiment. As depicted in the figure, a host 300 (e.g., a host channel adapter) can interact with a hypervisor 410, which can assign the various virtual functions 330, 340, 350, to a number of virtual machines. As well, the physical function can be handled by the hypervisor 310.

In accordance with an embodiment, the vPort concept is loosely defined in order to give freedom of implementation to vendors (e.g. the definition does not rule that the implementation has to be SRIOV specific), and a goal of the vPort is to standardize the way VMs are handled in subnets. With the vPort concept, both SR-IOV Shared-Port-like and vSwitch-like architectures or a combination of both, that can be more scalable in both the space and performance domains, can be defined. A vPort supports optional LIDs, and unlike the Shared-Port, the SM is aware of all the vPorts available in a subnet even if a vPort is not using a dedicated LID.

InfiniBand SR-IOV Architecture Models—vSwitch with Prepopulated LIDs

In accordance with an embodiment, the present disclosure provides a system and method for providing a vSwitch architecture with prepopulated LIDs.

Figure 7:
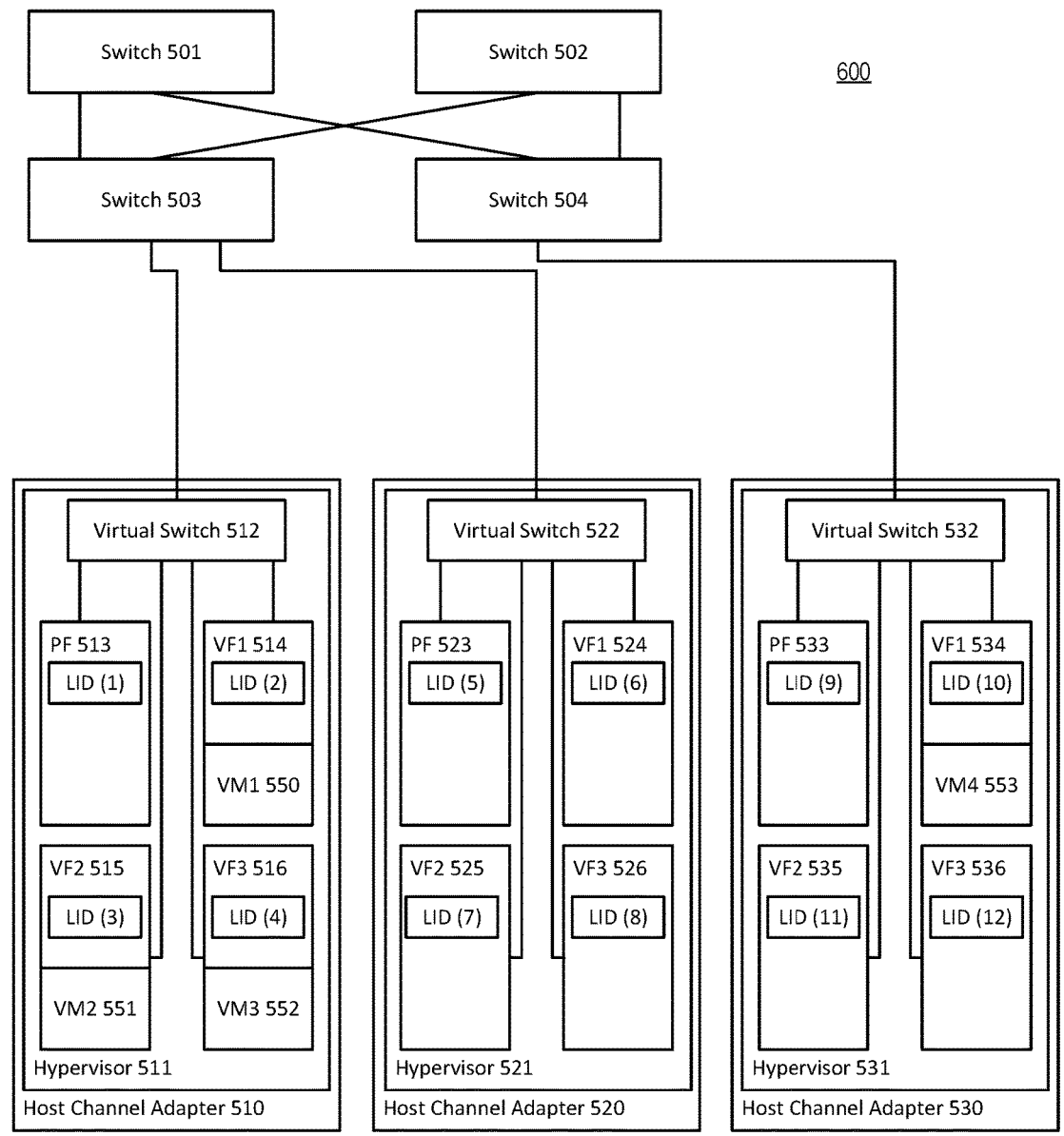
FIG. 7 shows an exemplary vSwitch architecture with prepopulated LIDs, in accordance with an embodiment.

FIG. 7 shows an exemplary vSwitch architecture with prepopulated LIDs, in accordance with an embodiment. As depicted in the figure, a number of switches 501-504 can provide communication within the network switched environment 600 (e.g., an IB subnet) between members of a fabric, such as an InfiniBand fabric. The fabric can include a number of hardware devices, such as host channel adapters 510, 520, 530. Each of the host channel adapters 510, 520, 530, can in turn interact with a hypervisor 511, 521, and 531, respectively. Each hypervisor can, in turn, in conjunction with the host channel adapter it interacts with, setup and assign a number of virtual functions 514, 515, 516, 524, 525, 526, 534, 535, 536, to a number of virtual machines. For example, virtual machine 1 550 can be assigned by the hypervisor 511 to virtual function 1 514. Hypervisor 511 can additionally assign virtual machine 2 551 to virtual function 2 515, and virtual machine 3 552 to virtual function 3 516. Hypervisor 531 can, in turn, assign virtual machine 4 553 to virtual function 1 534. The hypervisors can access the host channel adapters through a fully featured physical function 513, 523, 533, on each of the host channel adapters.

In accordance with an embodiment, each of the switches 501-504 can comprise a number of ports (not shown), which are used in setting a linear forwarding table in order to direct traffic within the network switched environment 600.

In accordance with an embodiment, the virtual switches 512, 522, and 532, can be handled by their respective hypervisors 511, 521, 531. In such a vSwitch architecture each virtual function is a complete virtual Host Channel Adapter (vHCA), meaning that the VM assigned to a VF is assigned a complete set of IB addresses (e.g., GID, GUID, LID) and a dedicated QP space in the hardware. For the rest of the network and the SM (not shown), the HCAs 510, 520, and 530 look like a switch, via the virtual switches, with additional nodes connected to them.

In accordance with an embodiment, the present disclosure provides a system and method for providing a vSwitch architecture with prepopulated LIDs. Referring to FIG. 7, the LIDs are prepopulated to the various physical functions 513, 523, 533, as well as the virtual functions 514-516, 524-526, 534-536 (even those virtual functions not currently associated with an active virtual machine). For example, physical function 513 is prepopulated with LID 1, while virtual function 1 534 is prepopulated with LID 10. The LIDs are prepopulated in an SR-IOV vSwitch-enabled subnet when the network is booted. Even when not all of the VFs are occupied by VMs in the network, the populated VFs are assigned with a LID as shown in FIG. 7.

In accordance with an embodiment, much like physical host channel adapters can have more than one port (two ports are common for redundancy), virtual HCAs can also be represented with two ports and be connected via one, two or more virtual switches to the external IB subnet.

In accordance with an embodiment, in a vSwitch architecture with prepopulated LIDs, each hypervisor can consume one LID for itself through the PF and one more LID for each additional VF. The sum of all the VFs available in all hypervisors in an IB subnet, gives the maximum amount of VMs that are allowed to run in the subnet. For example, in an IB subnet with 16 virtual functions per hypervisor in the subnet, then each hypervisor consumes 17 LIDs (one LID for each of the 16 virtual functions plus one LID for the physical function) in the subnet. In such an IB subnet, the theoretical hypervisor limit for a single subnet is ruled by the number of available unicast LIDs and is: 2891 (49151 available LIDs divided by 17 LIDs per hypervisor), and the total number of VMs (i.e., the limit) is 46256 (2891 hypervisors times 16 VFs per hypervisor). (In actuality, these numbers are actually smaller since each switch, router, or dedicated SM node in the IB subnet consumes a LID as well). Note that the vSwitch does not need to occupy an additional LID as it can share the LID with the PF In accordance with an embodiment, in a vSwitch architecture with prepopulated LIDs, communication paths are computed for all the LIDs the first time the network is booted. When a new VM needs to be started the system does not have to add a new LID in the subnet, an action that would otherwise cause a complete reconfiguration of the network, including path recalculation, which is the most time consuming part. Instead, an available port for a VM is located (i.e., an available virtual function) in one of the hypervisors and the virtual machine is attached to the available virtual function.

In accordance with an embodiment, a vSwitch architecture with prepopulated LIDs also allows for the ability to calculate and use different paths to reach different VMs hosted by the same hypervisor. Essentially, this allows for such subnets and networks to use a LID Mask Control (LMC) like feature to provide alternative paths towards one physical machine, without being bound by the limitation of the LMC that requires the LIDs to be sequential. The freedom to use non-sequential LIDs is particularly useful when a VM needs to be migrated and carry its associated LID to the destination.

In accordance with an embodiment, along with the benefits shown above of a vSwitch architecture with prepopulated LIDs, certain considerations can be taken into account. For example, because the LIDs are prepopulated in an SR-IOV vSwitch-enabled subnet when the network is booted, the initial path computation (e.g., on boot-up) can take longer than if the LIDs were not pre-populated.

InfiniBand SR-IOV Architecture Models—vSwitch with Dynamic LID Assignment

In accordance with an embodiment, the present disclosure provides a system and method for providing a vSwitch architecture with dynamic LID assignment.

Figure 8:
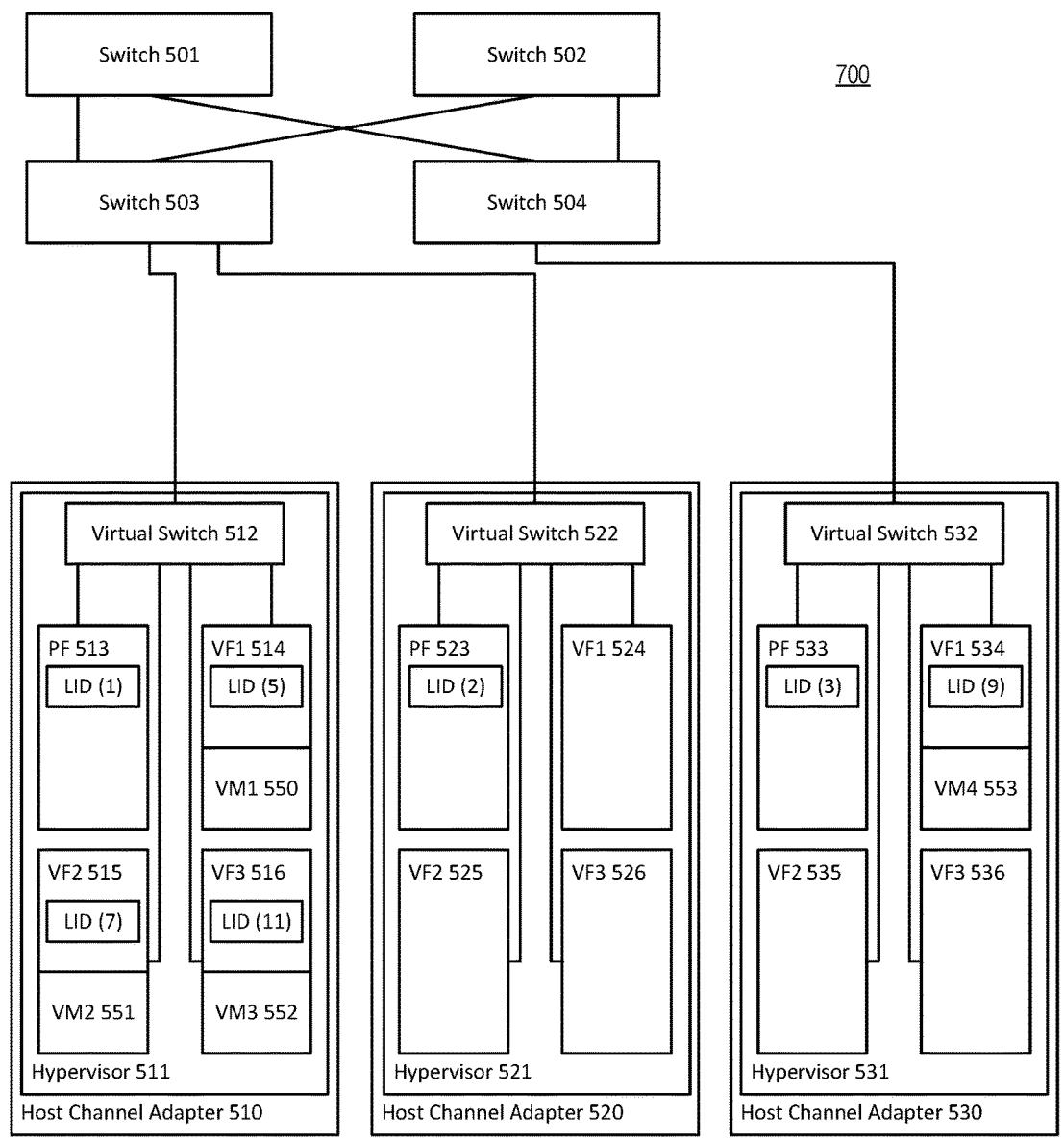
FIG. 8 shows an exemplary vSwitch architecture with dynamic LID assignment, in accordance with an embodiment.

FIG. 8 shows an exemplary vSwitch architecture with dynamic LID assignment, in accordance with an embodiment. As depicted in the figure, a number of switches 501-504 can provide communication within the network switched environment 700 (e.g., an IB subnet) between members of a fabric, such as an InfiniBand fabric. The fabric can include a number of hardware devices, such as host channel adapters 510, 520, 530. Each of the host channel adapters 510, 520, 530, can in turn interact with a hypervisor 511, 521, 531, respectively. Each hypervisor can, in turn, in conjunction with the host channel adapter it interacts with, setup and assign a number of virtual functions 514, 515, 516, 524, 525, 526, 534, 535, 536, to a number of virtual machines. For example, virtual machine 1 550 can be assigned by the hypervisor 511 to virtual function 1 514. Hypervisor 511 can additionally assign virtual machine 2 551 to virtual function 2 515, and virtual machine 3 552 to virtual function 3 516. Hypervisor 531 can, in turn, assign virtual machine 4 553 to virtual function 1 534. The hypervisors can access the host channel adapters through a fully featured physical function 513, 523, 533, on each of the host channel adapters.

In accordance with an embodiment, each of the switches 501-504 can comprise a number of ports (not shown), which are used in setting a linear forwarding table in order to direct traffic within the network switched environment 700.

In accordance with an embodiment, the virtual switches 512, 522, and 532, can be handled by their respective hypervisors 511, 521, 531. In such a vSwitch architecture each virtual function is a complete virtual Host Channel Adapter (vHCA), meaning that the VM assigned to a VF is assigned a complete set of IB addresses (e.g., GID, GUID, LID) and a dedicated QP space in the hardware. For the rest of the network and the SM (not shown), the HCAs 510, 520, and 530 look like a switch, via the virtual switches, with additional nodes connected to them.

In accordance with an embodiment, the present disclosure provides a system and method for providing a vSwitch architecture with dynamic LID assignment. Referring to FIG. 8, the LIDs are dynamically assigned to the various physical functions 513, 523, 533, with physical function 513 receiving LID 1, physical function 523 receiving LID 2, and physical function 533 receiving LID 3. Those virtual functions that are associated with an active virtual machine can also receive a dynamically assigned LID. For example, because virtual machine 1 550 is active and associated with virtual function 1 514, virtual function 514 can be assigned LID 5. Likewise, virtual function 2 515, virtual function 3 516, and virtual function 1 534 are each associated with an active virtual function. Because of this, these virtual functions are assigned LIDs, with LID 7 being assigned to virtual function 2 515, LID 11 being assigned to virtual function 3 516, and LID 9 being assigned to virtual function 1 534. Unlike vSwitch with prepopulated LIDs, those virtual functions not currently associated with an active virtual machine do not receive a LID assignment.

In accordance with an embodiment, with the dynamic LID assignment, the initial path computation can be substantially reduced. When the network is booting for the first time and no VMs are present then a relatively small number of LIDs can be used for the initial path calculation and LFT distribution.

In accordance with an embodiment, much like physical host channel adapters can have more than one port (two ports are common for redundancy), virtual HCAs can also be represented with two ports and be connected via one, two or more virtual switches to the external IB subnet.

In accordance with an embodiment, when a new VM is created in a system utilizing vSwitch with dynamic LID assignment, a free VM slot is found in order to decide on which hypervisor to boot the newly added VM, and a unique non-used unicast LID is found as well. However, there are no known paths in the network and the LFTs of the switches for handling the newly added LID. Computing a new set of paths in order to handle the newly added VM is not desirable in a dynamic environment where several VMs may be booted every minute. In large IB subnets, computing a new set of routes can take several minutes, and this procedure would have to repeat each time a new VM is booted.

Advantageously, in accordance with an embodiment, because all the VFs in a hypervisor share the same uplink with the PF, there is no need to compute a new set of routes. It is only needed to iterate through the LFTs of all the physical switches in the network, copy the forwarding port from the LID entry that belongs to the PF of the hypervisor—where the VM is created—to the newly added LID, and send a single SMP to update the corresponding LFT block of the particular switch. Thus the system and method avoids the need to compute a new set of routes.

In accordance with an embodiment, the LIDs assigned in the vSwitch with dynamic LID assignment architecture do not have to be sequential. When comparing the LIDs assigned on VMs on each hypervisor in vSwitch with prepopulated LIDs versus vSwitch with dynamic LID assignment, it is notable that the LIDs assigned in the dynamic LID assignment architecture are non-sequential, while those prepopulated in are sequential in nature. In the vSwitch dynamic LID assignment architecture, when a new VM is created, the next available LID is used throughout the lifetime of the VM. Conversely, in a vSwitch with prepopulated LIDs, each VM inherits the LID that is already assigned to the corresponding VF, and in a network without live migrations, VMs consecutively attached to a given VF get the same LID.

In accordance with an embodiment, the vSwitch with dynamic LID assignment architecture can resolve the drawbacks of the vSwitch with prepopulated LIDs architecture model at a cost of some additional network and runtime SM overhead. Each time a VM is created, the LFTs of the physical switches in the subnet are updated with the newly added LID associated with the created VM. One subnet management packet (SMP) per switch is needed to be sent for this operation. The LMC-like functionality is also not available, because each VM is using the same path as its host hypervisor. However, there is no limitation on the total amount of VFs present in all hypervisors, and the number of VFs may exceed that of the unicast LID limit. Of course, not all of the VFs are allowed to be attached on active VMs simultaneously if this is the case, but having more spare hypervisors and VFs adds flexibility for disaster recovery and optimization of fragmented networks when operating close to the unicast LID limit.

Figure 9:
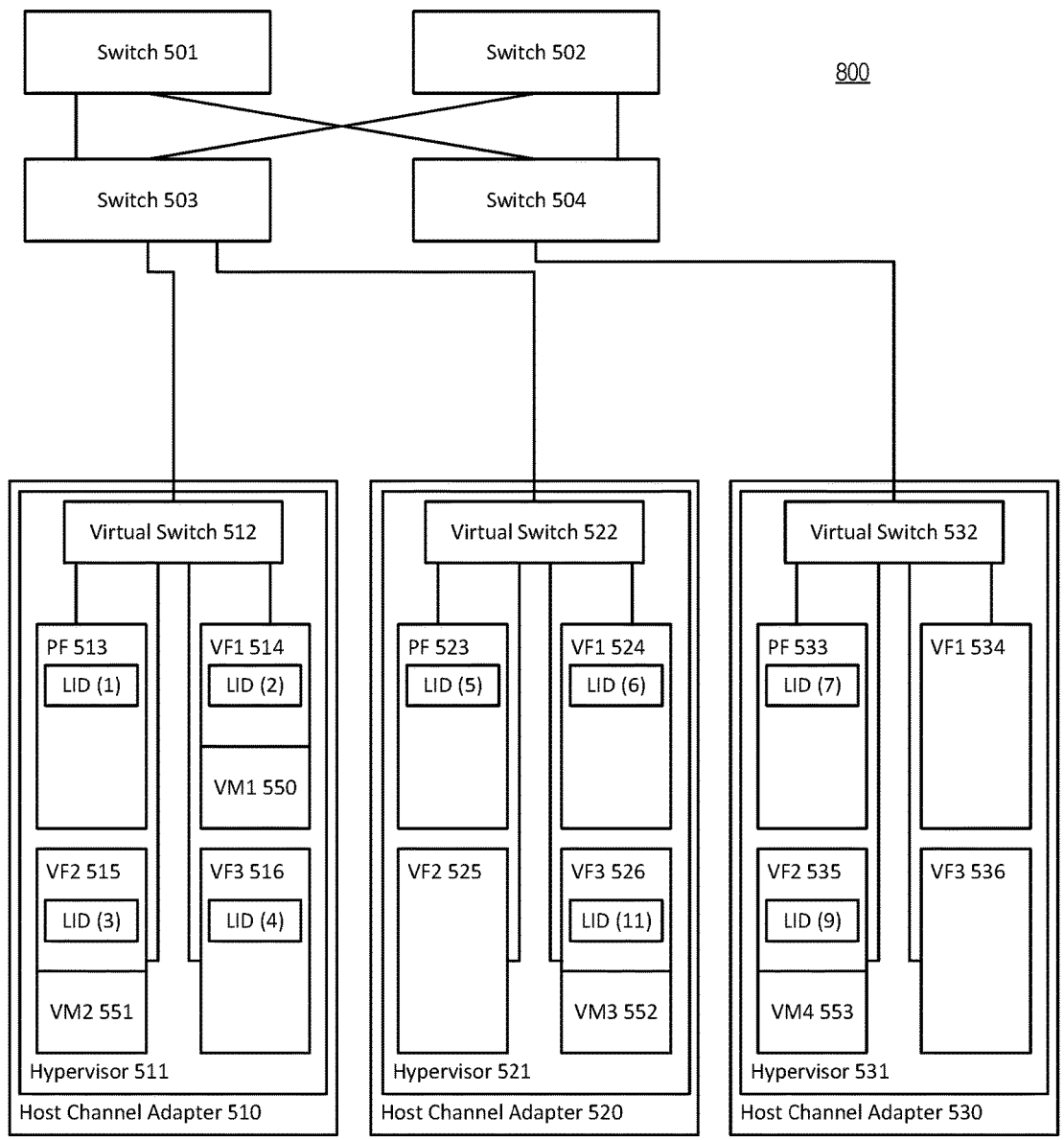
FIG. 9 shows an exemplary vSwitch architecture with vSwitch with dynamic LID assignment and prepopulated LIDs, in accordance with an embodiment.

InfiniBand SR-IOV Architecture Models—vSwitch with Dynamic LID Assignment and Prepopulated LIDs FIG. 9 shows an exemplary vSwitch architecture with vSwitch with dynamic LID assignment and prepopulated LIDs, in accordance with an embodiment. As depicted in the figure, a number of switches 501-504 can provide communication within the network switched environment 800 (e.g., an IB subnet) between members of a fabric, such as an InfiniBand fabric. The fabric can include a number of hardware devices, such as host channel adapters 510, 520, 530. Each of the host channel adapters 510, 520, 530, can in turn interact with a hypervisor 511, 521, and 531, respectively. Each hypervisor can, in turn, in conjunction with the host channel adapter it interacts with, setup and assign a number of virtual functions 514, 515, 516, 524, 525, 526, 534, 535, 536, to a number of virtual machines. For example, virtual machine 1 550 can be assigned by the hypervisor 511 to virtual function 1 514. Hypervisor 511 can additionally assign virtual machine 2 551 to virtual function 2 515. Hypervisor 521 can assign virtual machine 3 552 to virtual function 3 526. Hypervisor 531 can, in turn, assign virtual machine 4 553 to virtual function 2 535. The hypervisors can access the host channel adapters through a fully featured physical function 513, 523, 533, on each of the host channel adapters.

In accordance with an embodiment, each of the switches 501-504 can comprise a number of ports (not shown), which are used in setting a linear forwarding table in order to direct traffic within the network switched environment 800.

In accordance with an embodiment, the virtual switches 512, 522, and 532, can be handled by their respective hypervisors 511, 521, 531. In such a vSwitch architecture each virtual function is a complete virtual Host Channel Adapter (vHCA), meaning that the VM assigned to a VF is assigned a complete set of IB addresses (e.g., GID, GUID, LID) and a dedicated QP space in the hardware. For the rest of the network and the SM (not shown), the HCAs 510, 520, and 530 look like a switch, via the virtual switches, with additional nodes connected to them.

In accordance with an embodiment, the present disclosure provides a system and method for providing a hybrid vSwitch architecture with dynamic LID assignment and prepopulated LIDs. Referring to FIG. 9, hypervisor 511 can be arranged with vSwitch with prepopulated LIDs architecture, while hypervisor 521 can be arranged with vSwitch with prepopulated LIDs and dynamic LID assignment. Hypervisor 531 can be arranged with vSwitch with dynamic LID assignment. Thus, the physical function 513 and virtual functions 514-516 have their LIDs prepopulated (i.e., even those virtual functions not attached to an active virtual machine are assigned a LID). Physical function 523 and virtual function 1 524 can have their LIDs prepopulated, while virtual function 2 and 3, 525 and 526, have their LIDs dynamically assigned (i.e., virtual function 2 525 is available for dynamic LID assignment, and virtual function 3 526 has a LID of 11 dynamically assigned as virtual machine 3 552 is attached). Finally, the functions (physical function and virtual functions) associated with hypervisor 3 531 can have their LIDs dynamically assigned. This results in virtual functions 1 and 3, 534 and 536, are available for dynamic LID assignment, while virtual function 2 535 has LID of 9 dynamically assigned as virtual machine 4 553 is attached there.

In accordance with an embodiment, such as that depicted in FIG. 9, where both vSwitch with prepopulated LIDs and vSwitch with dynamic LID assignment are utilized (independently or in combination within any given hypervisor), the number of prepopulated LIDs per host channel adapter can be defined by a fabric administrator and can be in the range of 0<=prepopulated VFs<=Total VFs (per host channel adapter), and the VFs available for dynamic LID assignment can be found by subtracting the number of prepopulated VFs from the total number of VFs (per host channel adapter).

In accordance with an embodiment, much like physical host channel adapters can have more than one port (two ports are common for redundancy), virtual HCAs can also be represented with two ports and be connected via one, two or more virtual switches to the external IB subnet.

InfiniBand—Inter Subnet Communication (Fabric Manager)

In accordance with an embodiment, in addition to providing an InfiniBand fabric within a single subnet, embodiments of the current disclosure can also provide for an InfiniBand fabric that spans two or more subnets.

Figure 10:
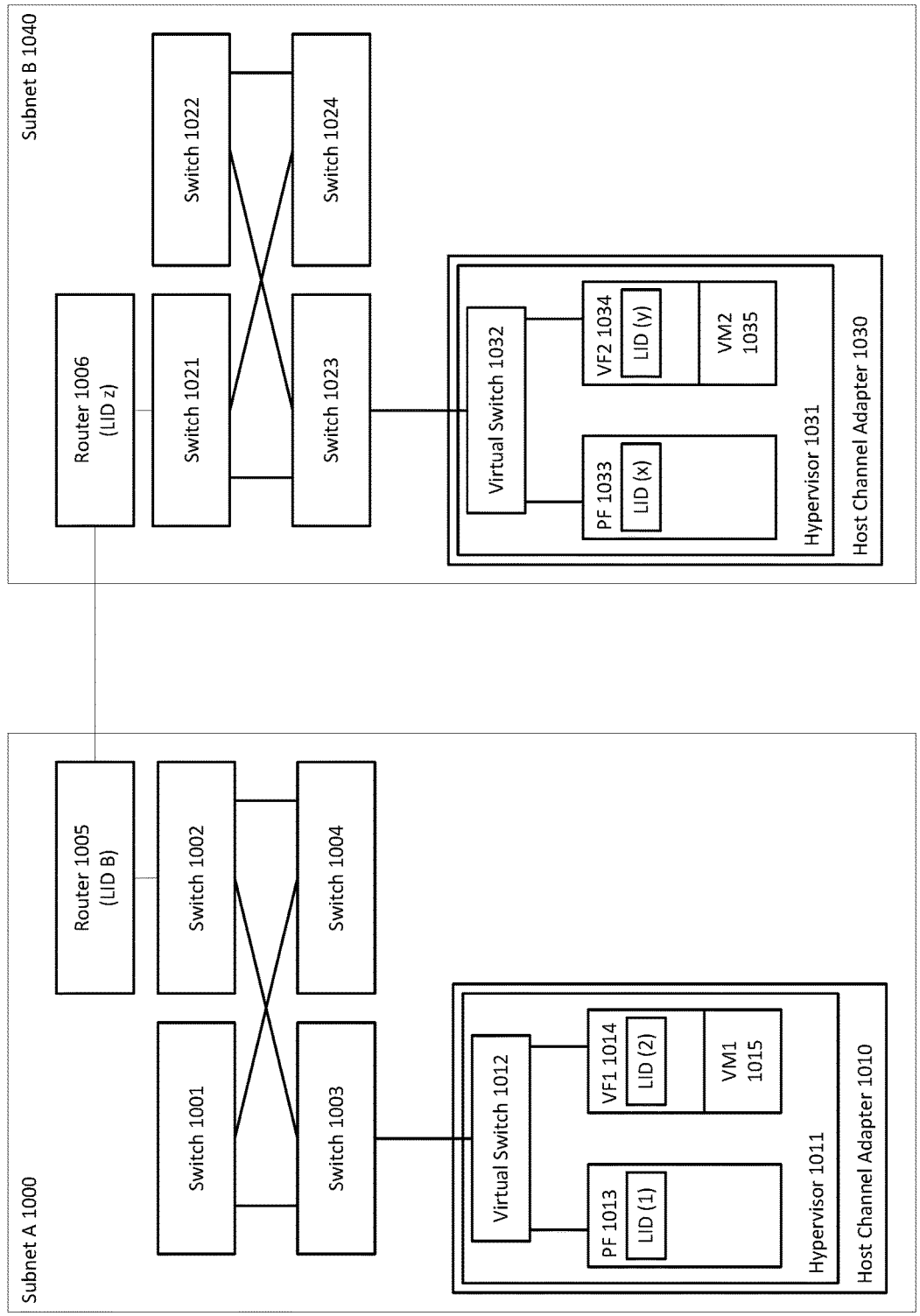
FIG. 10 shows an exemplary multi-subnet InfiniBand fabric, in accordance with an embodiment.

FIG. 10 shows an exemplary multi-subnet InfiniBand fabric, in accordance with an embodiment. As depicted in the figure, within subnet A 1000, a number of switches 1001-1004 can provide communication within subnet A 1000 (e.g., an IB subnet) between members of a fabric, such as an InfiniBand fabric. The fabric can include a number of hardware devices, such as, for example, channel adapter 1010. Host channel adapter 1010 can in turn interact with a hypervisor 1011. The hypervisor can, in turn, in conjunction with the host channel adapter it interacts with, setup a number of virtual functions 1014. The hypervisor can additionally assign virtual machines to each of the virtual functions, such as virtual machine 1 1015 being assigned to virtual function 1 1014. The hypervisor can access their associated host channel adapters through a fully featured physical function, such as physical function 1013, on each of the host channel adapters. Within subnet B 1040, a number of switches 1021-1024 can provide communication within subnet B 1040 (e.g., an IB subnet) between members of a fabric, such as an InfiniBand fabric. The fabric can include a number of hardware devices, such as, for example, channel adapter 1030. Host channel adapter 1030 can in turn interact with a hypervisor 1031. The hypervisor can, in turn, in conjunction with the host channel adapter it interacts with, setup a number of virtual functions 1034. The hypervisor can additionally assign virtual machines to each of the virtual functions, such as virtual machine 2 1035 being assigned to virtual function 2 1034. The hypervisor can access their associated host channel adapters through a fully featured physical function, such as physical function 1033, on each of the host channel adapters. It is noted that although only one host channel adapter is shown within each subnet (i.e., subnet A and subnet B), it is to be understood that a plurality of host channel adapters, and their corresponding components, can be included within each subnet.

In accordance with an embodiment, each of the host channel adapters can additionally be associated with a virtual switch, such as virtual switch 1012 and virtual switch 1032, and each HCA can be set up with a different architecture model, as discussed above. Although both subnets within FIG. 10 are shown as using a vSwitch with prepopulated LID architecture model, this is not meant to imply that all such subnet configurations must follow a similar architecture model.

In accordance with an embodiment, at least one switch within each subnet can be associated with a router, such as switch 1002 within subnet A 1000 being associated with router 1005, and switch 1021 within subnet B 1040 being associated with router 1006.

In accordance with an embodiment, at least one device (e.g., a switch, a node . . . etc.) can be associated with a fabric manager (not shown). The fabric manager can be used, for example, to discover inter-subnet fabric topology, create a fabric profile (e.g., a virtual machine fabric profile), build virtual machine related database objects that forms the basis for building a virtual machine fabric profile. In addition, the fabric manager can define legal inter-subnet connectivity in terms of which subnets are allowed to communicate via which router ports using which partition numbers.

In accordance with an embodiment, when traffic at an originating source, such as virtual machine 1 within subnet A, is addressed to a destination in a different subnet, such as virtual machine 2 within subnet B, the traffic can be addressed to the router within subnet A, i.e., router 1005, which can then pass the traffic to subnet B via its link with router 1006.

Virtual Dual Port Router

In accordance with an embodiment, a dual port router abstraction can provide a simple way for enabling subnet-to-subnet router functionality to be defined based on a switch hardware implementation that has the ability to do GRH (global route header) to LRH (local route header) conversion in addition to performing normal LRH based switching.

In accordance with an embodiment, a virtual dual-port router can logically be connected outside a corresponding switch port. This virtual dual-port router can provide an InfiniBand specification compliant view to a standard management entity, such as a Subnet Manager.

In accordance with an embodiment, a dual-ported router model implies that different subnets can be connected in a way where each subnet fully controls the forwarding of packets as well as address mappings in the ingress path to the subnet, and without impacting the routing and logical connectivity within either of the incorrectly connected subnets.

In accordance with an embodiment, in a situation involving an incorrectly connected fabric, the use of a virtual dual-port router abstraction can also allow a management entity, such as a Subnet Manager and IB diagnostic software, to behave correctly in the presence of un-intended physical connectivity to a remote subnet.

Figure 11:
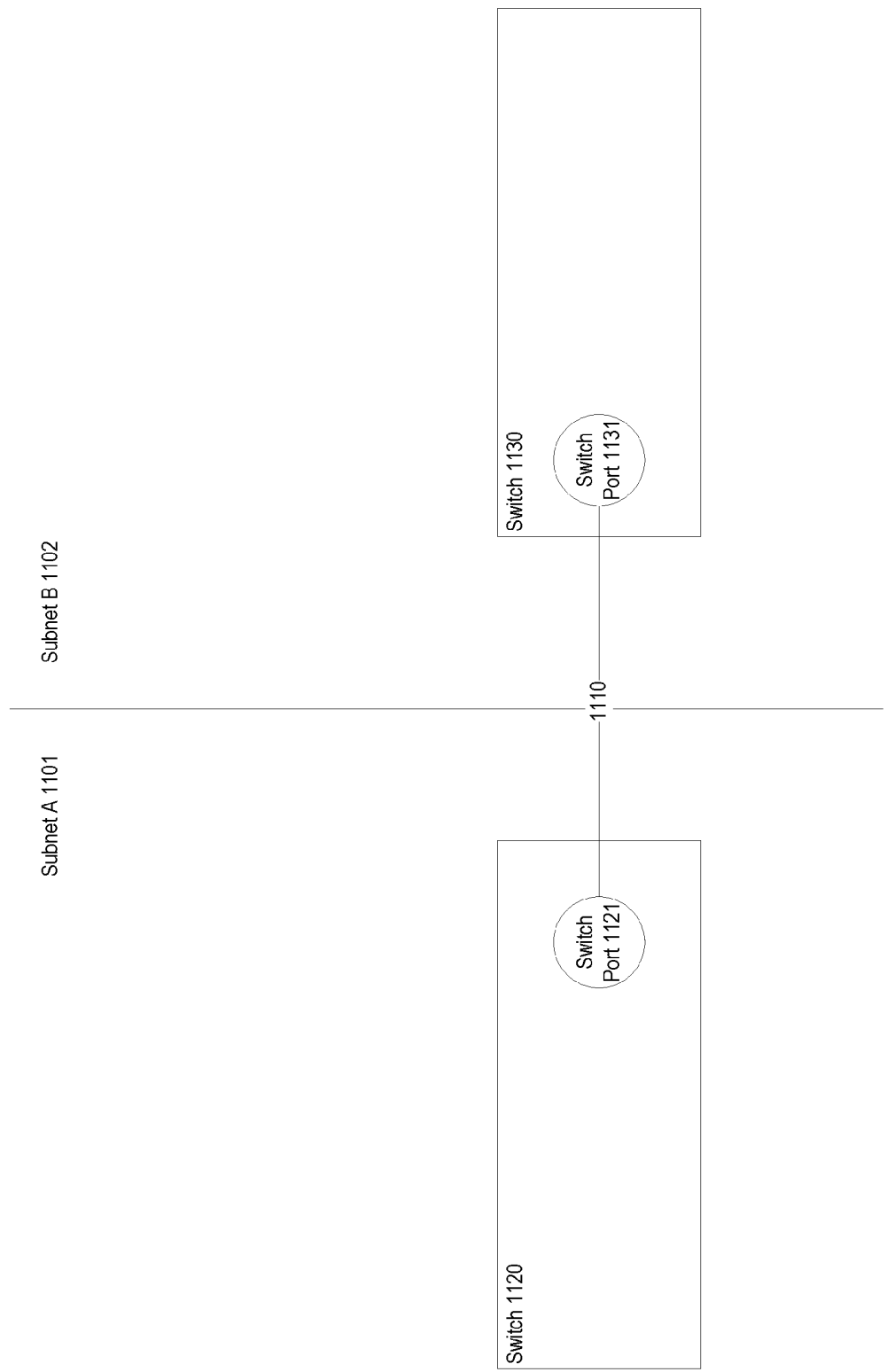
FIG. 11 shows an interconnection between two subnets in a high performance computing environment, in accordance with an embodiment.

FIG. 11 shows an interconnection between two subnets in a high performance computing environment, in accordance with an embodiment. Prior to configuration with a virtual dual port router, a switch 1120 in subnetA 1101 can be connected through a switch port 1121 of switch 1120, via a physical connection 1110, to a switch 1130 in subnet B 1102, via a switch port 1131 of switch 1130. In such an embodiment, each switch port, 1121 and 1131, can act both as switch ports and router ports.

In accordance with an embodiment, a problem with this configuration is that a management entity, such as a subnet manager in an InfiniBand subnet, cannot distinguish between a physical port that is both a switch port and a router port. In such a situation, a SM can treat the switch port as having a router port connected to that switch port. But if the switch port is connected to another subnet, via, for example, a physical link, with another subnet manager, then the subnet manager can be able to send a discovery message out on the physical link. However, such a discovery message cannot be allowed at the other subnet.

Figure 12:
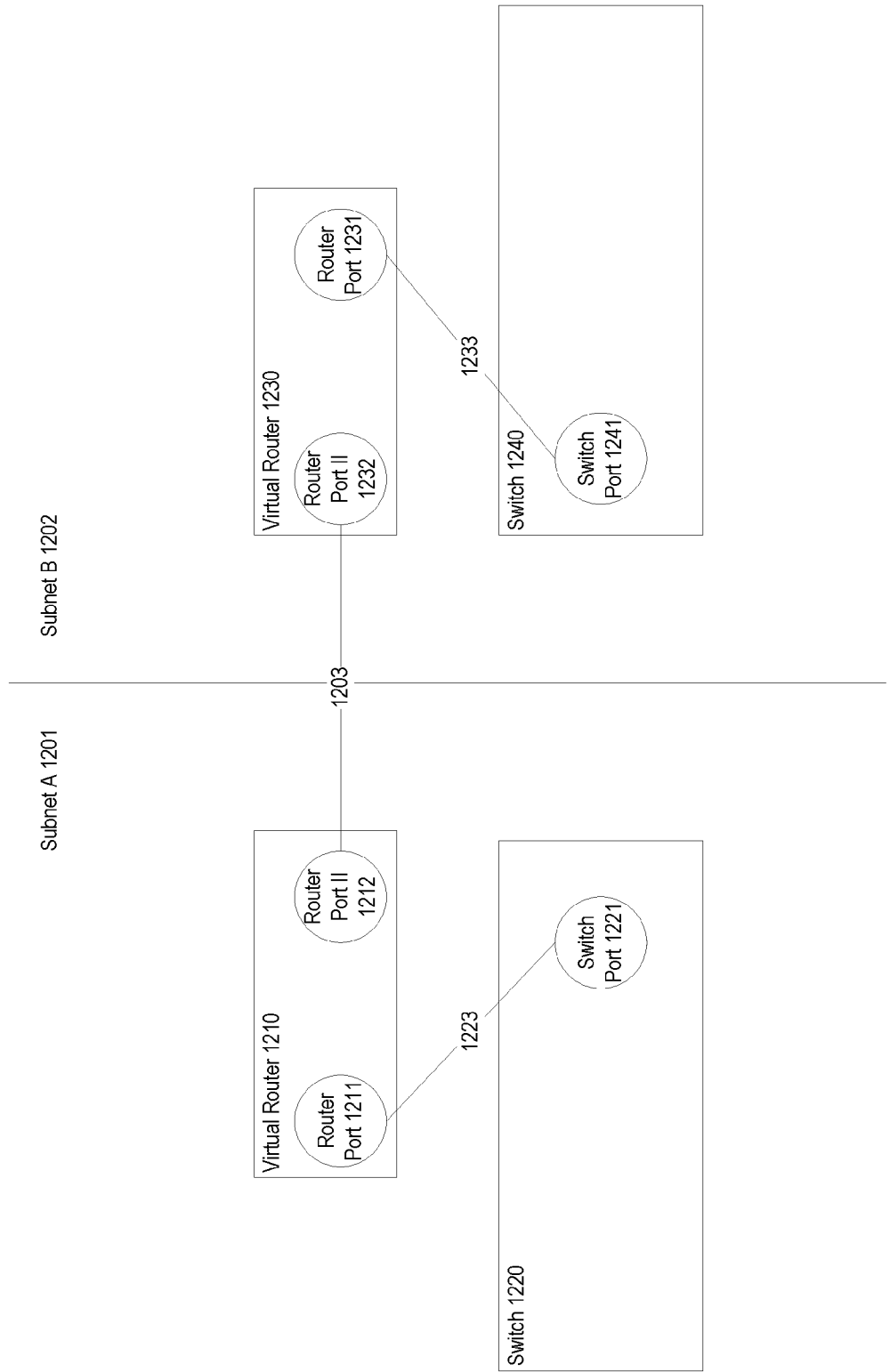
FIG. 12 shows an interconnection between two subnets via a dual-port virtual router configuration in a high performance computing environment, in accordance with an embodiment.

FIG. 12 shows an interconnection between two subnets via a dual-port virtual router configuration in a high performance computing environment, in accordance with an embodiment.

In accordance with an embodiment, after configuration, a dual-port virtual router configuration can be provided such that a subnet manager sees a proper end node, signifying an end of the subnet that the subnet manager is responsible for.

In accordance with an embodiment, at a switch 1220 in subnetA 1201, a switch port can be connected (i.e., logically connected) to a router port 1211 in a virtual router 1210 via a virtual link 1223. The virtual router 1210 (e.g., a dual-port virtual router), which while shown as being external to the switch 1220 can, in embodiments, be logically contained within the switch 1220, can also comprise a second router port, router port II 1212. In accordance with an embodiment, a physical link 1203, which can have two ends, can connect the subnetA 1201 via first end of the physical link with subnet B 1202 via a second end of the physical link, via router port II 1212 and router port II 1232, contained in virtual router 1230 in subnet B 1202. Virtual router 1230 can additionally comprise router port 1231, which can be connected (i.e., logically connected) to switch port 1241 on switch 1240 via a virtual link 1233.

In accordance with an embodiment, a subnet manager (not shown) on subnetA can detect router port 1211, on virtual router 1210 as an end point of the subnet that the subnet manager controls. The dual-port virtual router abstraction can allow the subnet manager on subnetA to deal with subnetA in a usual manner (e.g., as defined per the InifiniBand specification). At the subnet management agent level, the dual-port virtual router abstraction can be provided such that the SM sees the normal switch port, and then at the SMA level, the abstraction that there is another port connected to the switch port, and this port is a router port on a dual-port virtual router. In the local SM, a conventional fabric topology can continue to be used (the SM sees the port as a standard switch port in the topology), and thus the SM sees the router port as an end port. Physical connection can be made between two switch ports that are also configured as router ports in two different subnets.

In accordance with an embodiment, the dual-port virtual router can also resolve the issue that a physical link could be mistakenly connected to some other switch port in the same subnet, or to a switch port that was not intended to provide a connection to another subnet. Therefore, the methods and systems described herein also provide a representation of what is on the outside of a subnet.

In accordance with an embodiment, within a subnet, such as subnet A, a local SM determines a switch port, and then determines a router port connected to that switch port (e.g., router port 1211 connected, via a virtual link 1223, to switch port 1221). Because the SM sees the router port 1211 as the end of the subnet that the SM manages, the SM cannot send discovery and/or management messages beyond this point (e.g., to router port II 1212).

In accordance with an embodiment, the dual-port virtual router described above provides a benefit that the dual-port virtual router abstraction is entirely managed by a management entity (e.g., SM or SMA) within the subnet that the dual-port virtual router belongs to. By allowing management solely on the local side, a system does not have to provide an external, independent management entity. That is, each side of a subnet to subnet connection can be responsible for configuring its own dual-port virtual router.

In accordance with an embodiment, in a situation where a packet, such as an SMP, is addressed to a remote destination (i.e., outside of the local subnet) arrives local target port that is not configured via the dual-port virtual router described above, then the local port can return a message specifying that it is not a router port.

Many features of the present invention can be performed in, using, or with the assistance of hardware, software, firmware, or combinations thereof. Consequently, features of the present invention may be implemented using a processing system (e.g., including one or more processors).

Figure 13:
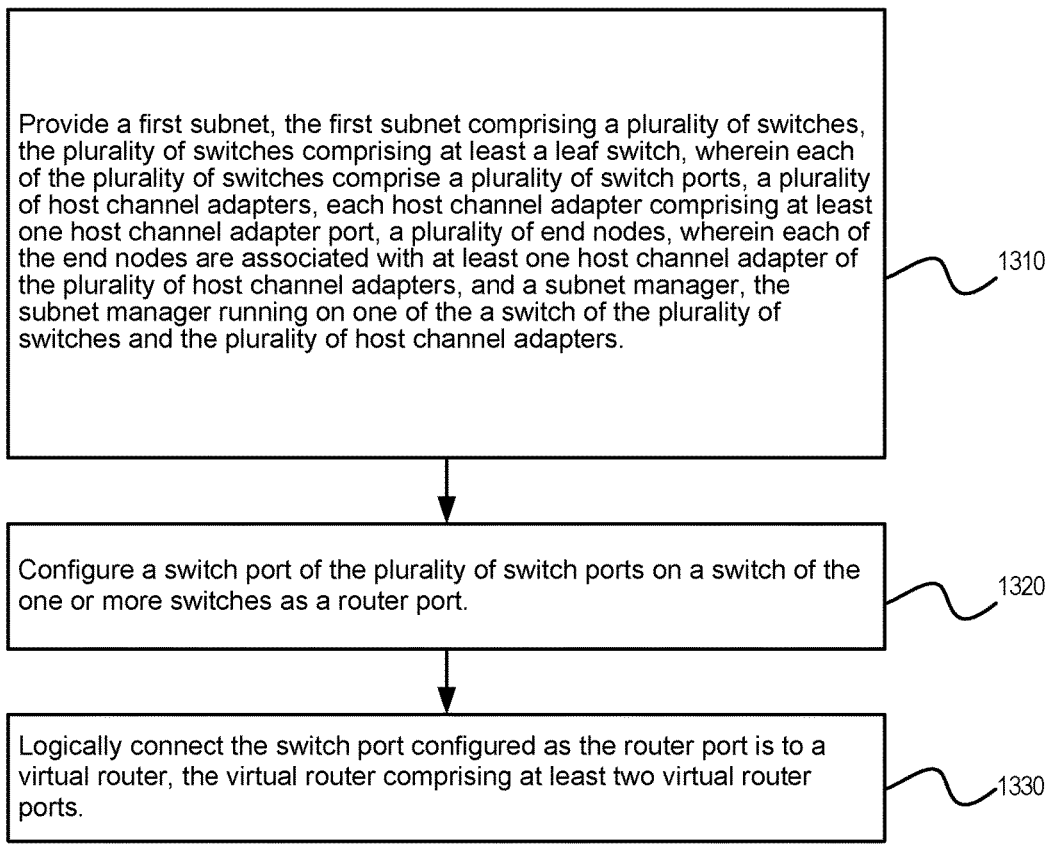
FIG. 13 shows a flowchart of a method for supporting dual-port virtual router in a high performance computing environment, in accordance with an embodiment.

FIG. 13 shows a method for supporting dual-port virtual router in a high performance computing environment, in accordance with an embodiment. At step 1310, the method can provide at one or more computers, including one or more microprocessors, a first subnet, the first subnet comprising a plurality of switches, the plurality of switches comprising at least a leaf switch, wherein each of the plurality of switches comprise a plurality of switch ports, a plurality of host channel adapters, each host channel adapter comprising at least one host channel adapter port, a plurality of end nodes, wherein each of the end nodes are associated with at least one host channel adapter of the plurality of host channel adapters, and a subnet manager, the subnet manager running on one of the plurality of switches and the plurality of host channel adapters.

At step 1320, the method can configure a switch port of the plurality of switch ports on a switch of the plurality of switches as a router port.

At step 1330, the method can logically connect the switch port configured as the router port to a virtual router, the virtual router comprising at least two virtual router ports.

Router SMA Abstraction in Order to Allow SMP-Based Connectivity Checks

In accordance with an embodiment, a Subnet Management Packet (SMP) is not allowed to have addressing information that implies that the packet will be sent beyond router ports. However, in order to allow discovery of physical connectivity on the remote side of a (virtual) router port (that is, local discovery of remote connectivity), a new set of SMA attributes can be defined, where each such new attribute represents an indication of "remote information" along with either a standard or vendor specific SMA attribute.

In accordance with an embodiment, when a router SMA processes attributes that represent "remote" information/attributes, then a corresponding SMP request can be sent on the external physical link in a way that is fully transparent to the sender of the original request.

In accordance with an embodiment, a local SMA can chose to perform remote discovery independently of incoming requests and then cache relevant information locally, or it can act like a simple proxy and generate a corresponding request to the external link each time it receives a request specifying "remote" information/attributes.

In accordance with an embodiment, by tracking whether an SMP requesting a "remote" attribute is received from the local subnet side (i.e., the virtual router port that is logically connected to the local switch port) or from the external link (i.e., the remote side of the virtual router), the SMA implementation can track to what extent the remote request is valid in terms of either representing the original request in the local subnet or representing a proxy request from a peer router port.

In accordance with an embodiment, for an IB specification compliant SM, a router port is an end port in a subnet. Because of this, low-level SMPs (used to discovery and configure the subnet) cannot be sent across a router port. However, in order to maintain routes for inter-subnet traffic, a local SM or fabric manager needs to be able to observe the physical connectivity on a remote side of a physical link before it makes any configuration of the local resources. However, in connection with this desire to see the remote connectivity, a SM cannot be allowed to configure the remote side of a physical link (that is, a SM's configuration must be contained within its own subnet).

In accordance with an embodiment, SMA model enhancements allow for the possibility to send a packet (i.e., SMP) that is addressed to a local router port. The SMA where the packet is addressed can receive the packet, and then apply a new attribute that defines that the requested information is on a remote node (e.g., connected by a physical link across subnets).

In accordance with an embodiment, the SMA can operate as a proxy (receives an SMP and sends another request), or the SMA can modify the original packet and sent it on as an inter-subnet packet. The SMA can update the address information in the packet. This update the addition of a 1-hop direct route path to the SMP. The SMP can then be received by the remote node (router port). The SMP can work independently of whether or not the node on the remote end is configured in the same manner (e.g., as a virtual router), or configured as a basic switch port (e.g., physical connectivity to a legacy switch implementation). Then the request packet that the receiving node will see is a basic request, and it will respond in the normal way. The fact that the request originated beyond the subnet is transparent (invisible) to the receiving node.

In accordance with an embodiment, this allows for remote subnet discovery, by a local subnet, by utilizing the abstraction. The provided SMA abstraction allows for the retrieval of information from a remote subnet (e.g., across a physical link) without the remote side realizing that it has been queried from the local (i.e., remote to the subnet discovery being performed on) subnet.

Addressing Scheme

In accordance with an embodiment, in order to stay compliant with the IB specification, SMP packets are bound by the boundaries of the subnet (i.e., the SM is not allowed to "see," or discover information, outside of the subnet it is associated with). However, there still exists a need to retrieve information, such as connectivity information, from a remote end of a virtual router port (i.e., one "hop" beyond the subnet boundary). This information can be encoded into a special type of SMP, which can be referred to as a vendor specific SMP (VSMP).

In accordance with an embodiment, a VSMP can generally utilize an addressing scheme that is similar to a general SMP (subnet bound SMP), both DR (Directed Routing—where an SMP can explicitly indicate which port it exists from when going from switch to switch) and LID routing can be used. However, for those attributes that can apply to a remote end of a router port, a single bit in an attribute modifier can be used to indicate local port versus remote port. If a remote bit of an attribute is set, then additional handling can occur at the SMA representing the router port.

In accordance with an embodiment, an important aspect of the addressing scheme is that the remote peer port of the router port be able to respond to the request, even in case of erroneous configuration or wiring of the system. For instance if the virtual router is connected, via a physical link for example, to a remote subnet at a general switch port of the remote subnet, the SMA handing the general switch port of the remote subnet can respond to the request with status value indicating that the remote attribute is not supported, and the response can reach the requesting SM.

In accordance with an embodiment, an SMP (i.e., VSMP) can be sent to a local router port, either through the use of a DR path or via the LID of the router port. If the information requested is for the remote peer port of the router port, then the remote flag/bit of the attribute modifier can be set. When the SMA receives such a VSMP, it can alter the packet and add an additional DR step addressing the remote end.

In accordance with an embodiment, a portion (e.g., a bit of a 16 bit attribute modifier) of the packet attribute can be used to signal whether the VSMP is local or remote. For example, by setting this portion to a value of 1 can imply that the remote peer port is the final destination for the VSMP. This portion of the attribute can be referred to as the remote flag.

In accordance with an embodiment, in addition to the remote flag, there can be additional flags that can indicate which destination instances that should process the VSMP along the way to the final destination. Two additional portions (e.g., two bits of the attribute modifier) of the packet attribute can be used for this purpose. A first portion (e.g., bit 20), referred to as first receiver flag, can indicate that the packet is expected to be processed when received by the local router port (which should match the destination address of the original request). When all the expected processing at the first receiver is done, a second portion (e.g., bit 21 of the attribute modifier) of the packet attribute can be set and the packet forwarded on to the remote end. This second portion can be referred to as the second receiver flag.

DR Routed Packet

In accordance with an embodiment, by way of example, a DR routed packet can follow an exemplary flow. A source node, at LID A, can initiate the request packet specifying router 1 as the destination node. An exemplary DR routed packet configuration is here:

MADHdr.Class=0x81 (DR routed SMP)
MADHdr.Method=0x1 (Get)
LRH.SLID=LRH. DLID=0xffff (the permissive LID)

MADHdr.DrSLID=MADHdr.DrDLID=0xffff
MADHdr.AttrID=<VSMP attrID>
MADHdr.AttrMod.remote=1
MADHdr.AttrMod.first_receiver=1
MADHdr.InitPath=DR path to Rtr1 (LID B)
MADHdr.HopCnt=N
MADHdr.HopPtr=0

When the request packet arrives at router 1, it can be passed on to a corresponding SMA, which can then verify that the request is valid. After verifying the validity of the request, the SMA can then modify the packet. This modification can include extending the DR path with one extra hop, and setting the second receiver flag. Such exemplary configuration modification is shown here:

MADHdr.HopCnt=N+1 (extend the DR path with one extra hop)
MADHdr.InitPath[N+1]=(virtual Router external port number (i.e. 2))
MADHdr.AttrMod.second_receiver=1

In accordance with an embodiment, the SMI (subnet management interface) layer of the SMA can update the DR with the extra hop before the SMA forwards the VSMP out on the physical link.

In accordance with an embodiment, for the SMA that receives the VSMP on the remote side of the physical link, the addressing scheme used by the VSMP can appear to be that of a normally IB defined packet.

In accordance with an embodiment, when the SMA receiving the VSMP on the remote side of the physical link is the VSMP's final destination, the VSMP can be validated by the received SMA. The validation can include checking input port relative to flag settings. If remote flag and both first and second receive flags are set, then the packet can be received on the physical port (i.e., from the external link side of the port configured with the virtual router). If remote and only the first receiver flag are set, then the packet can arrive on the virtual ink (i.e., from the internal switch side of the virtual router port). If the validation fails, then the status can be set to an appropriate error message.

Figure 14:
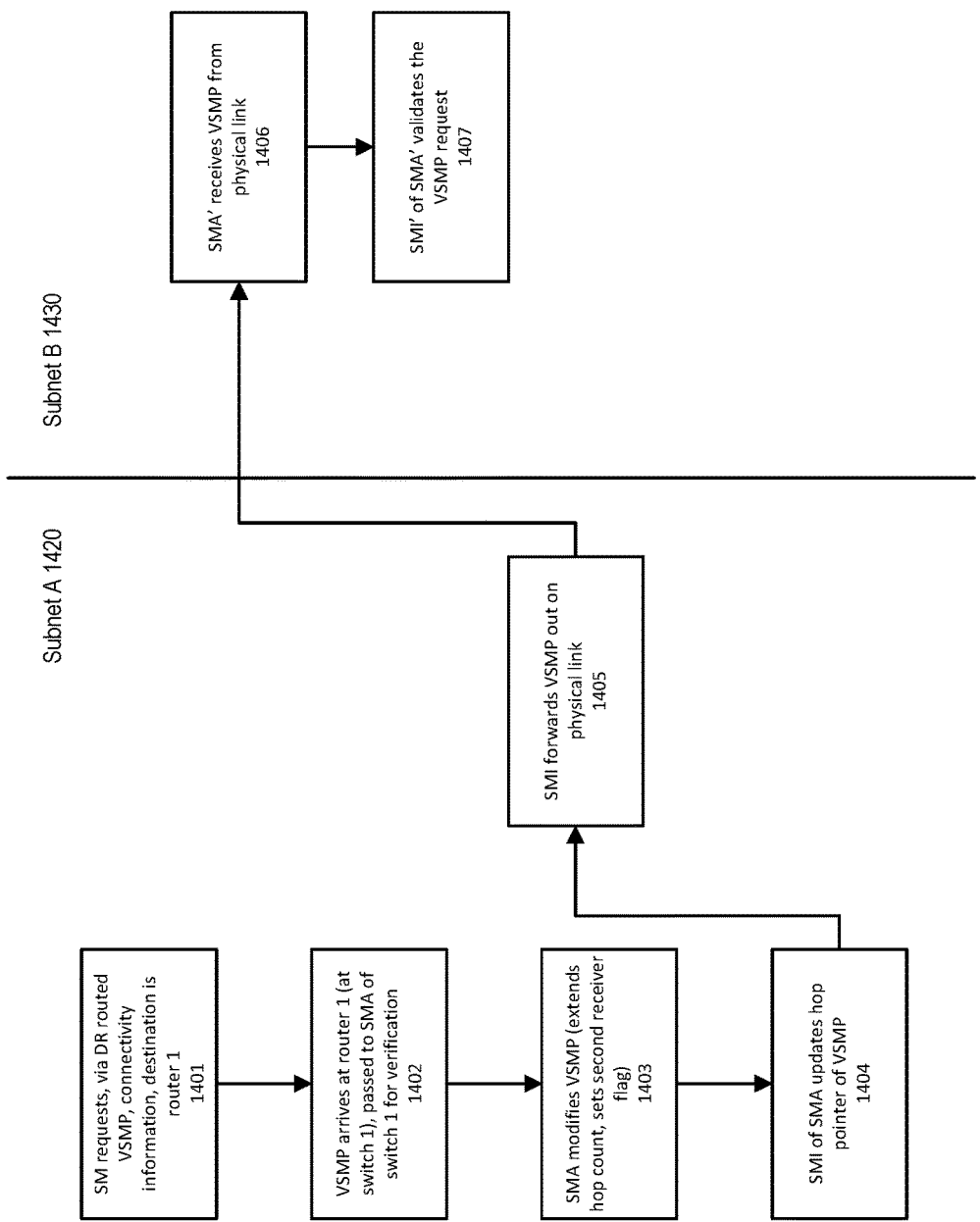
FIG. 14 is a flow chart illustrating a DR routed VSMP packet, in accordance with an embodiment.

FIG. 14 is a flow chart illustrating a DR routed VSMP packet, in accordance with an embodiment.

At step 1401, in accordance with an embodiment, within subnet A, an entity, such as a subnet manager of subnet A can request, via a DR routed VSMP, connectivity information. The destination of the DR routed VSMP can be a router within subnet A, such as router 1.

At step 1402, the DR routed VSMP can arrive at router 1. Router 1, in an embodiment and as described above, can be contained in a switch, such as switch 1. The DR routed VSMP can be passed to the SMA of switch 1 for verification.

At step 1403, in accordance with an embodiment, the SMA can modify the DR routed VSMP. The modification can include extending the hop counter (for the hop across the physical link to the second subnet), and setting the second receiver flag.

At step 1404, in accordance with an embodiment, the SMI (the SMI being associated with the SMA of the switch/router) can update the hop pointer of the VSMP.

At step 1405, in accordance with an embodiment, the SMI can forward the DR VSMP across the subnet boundary between subnet A 1420 and subnet B 1430, on a physical link, where a first end of the physical link can be connected to the router within subnet A, and the second end of the physical link can be connected to a router within subnet B.

At step 1406, in accordance with an embodiment, SMA' of the router 2 within subnet B 1430 can receive the VSMP from the physical link.

At step 1407, in accordance with an embodiment, SMI' (associated with SMA') can validate the VSMP request.

In accordance with an embodiment, the responding entity (e.g., the router on the remote side of the physical link) can complete the SMP response and set a direction attribute indicating a response. Such an exemplary configuration is shown here:

MADHdr.Method=0x81 (GetResp)
MADHdr.Direction=1 (indicating response)

In accordance with an embodiment, the SMI layer can then decrement the hop pointer and forward the response out on the physical link, back to the local side. The SMA at the local router can revert the modifications made on the request. The SMI at the local side router can perform the normal processing, including decrementing the hop and sending the response out on the virtual link to the switch (i.e., on the internal virtual link between the switch port and the virtual router port). For the next hop, the SMI can again decrement the hop and send the packet out on the physical switch port where the request originally arrived.

Figure 15:
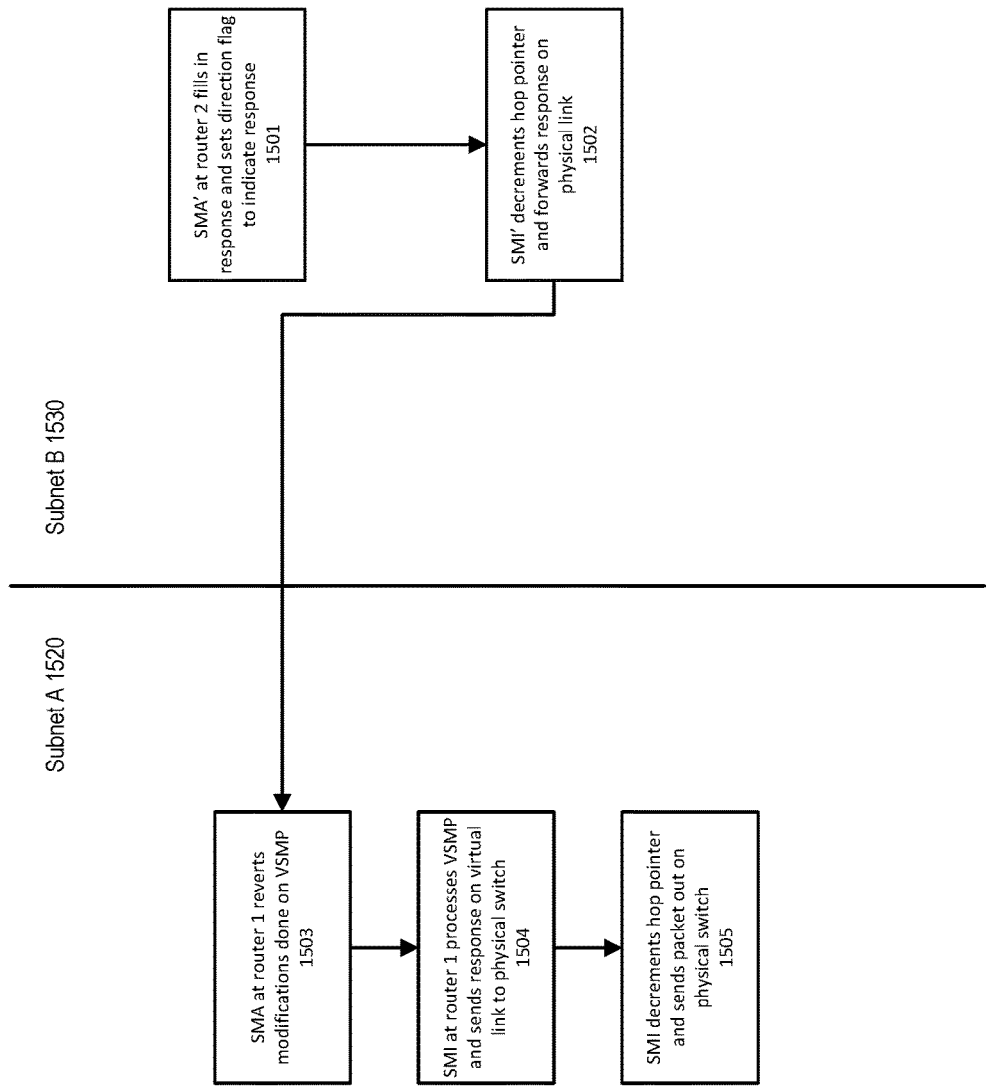
FIG. 15 is a flow chart illustrating a response to a DR routed VSMP packet, in accordance with an embodiment.

FIG. 15 is a flow chart illustrating a response to a DR routed VSMP packet, in accordance with an embodiment.

At step 1501, in accordance with an embodiment, SMA' of router 2 can fill in the responsive information to the VSMP (e.g., connectivity information), and set a directional flag in to indicate a response.

At step 1502, in accordance with an embodiment, SMI' can decrement the hop pointer of the response and forward the response back from subnet B 1530 to subnet A 1520 on, for example, a physical link having two ends. A first end of the physical link can be connected to the router within subnet A, and the second end of the physical link can be connected to a router within subnet B.

At step 1503, in accordance with an embodiment, the SMA at router 1 can receive the response and revert the modifications done on the VSMP.

At step 1504, in accordance with an embodiment, the SMI at router 1 can process the response to the VSMP and send the response on a link (e.g., virtual link between the virtual router 1 and the physical switch) to the physical switch.

At step 1505, in accordance with an embodiment, the SMI can decrement the hop point counter and send the packet out on the physical switch port where the VSMP was originally received.

LID Routed Packet

In accordance with an embodiment, by way of example, a LID routed packet can follow an exemplary flow. A source node, at LID A, can initiate the request packet specifying router 1 as the destination node. Such an exemplary packet could have the following configuration:

MADHdr.Class=0x01 (LID routed SMP)
MADHdr.Method=0x1 (Get)
LRH.SLID=LID A
LRH.DLID=LID B
MADHdr.AttrID=<VSMP attrID>
MADHdr.AttrMod.remote=1
MADHdr.AttrMod.first_receiver=1

In accordance with an embodiment, when the request packet arrives at router 1, it can be passed on to a corresponding SMA, which can then verify that the request is valid. After verifying the validity of the request, the SMA can then modify the packet. This modification can include adding a single DR path at the end. Consequently, this means that the total address can be a combination of both a LID routed packet and a DR routed hop. An exemplary configuration is here:

MADHdr.Class=0x81 (DR routed SMP)
MADHdr.HopCnt=1
MADHdr.HopPtr=0
MADHdr.Direction=0 (outbound)
MADHdr.InitPath[1]=(virtual Router external port number (i.e. 2))
MADHdr.DrSLID=LRH.SLID (I.e. LRH.SLID contains LID A from the original requester)
MADHdr.DrDLID=0xffff
MADHdr.AttrMod.second_receiver=1

In accordance with an embodiment, an SMI layer at the router can process the outbound packet normally, and send it out on the physical link. An exemplary configuration is here:
LRH.SLID=LRH.DLID=0xffff
MADHdr.HopPtr=1 (increment by 1)

In accordance with an embodiment, the SMI at the destination router (at the other end of the physical link) can determine that it is the destination for the request and pass the VSMP onto the associated SMA.

Figure 16:
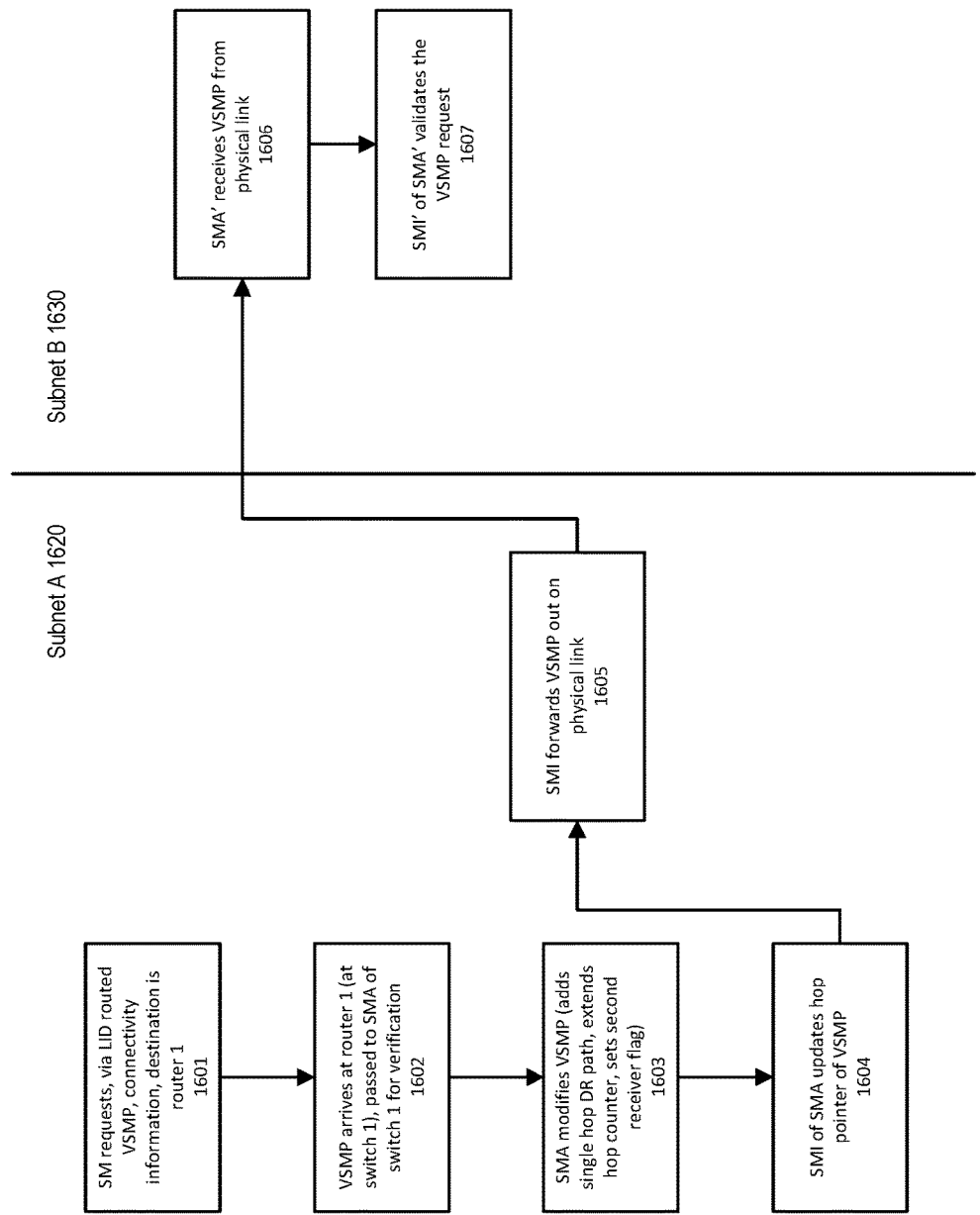
FIG. 16 is a flow chart illustrating a LID routed VSMP packet, in accordance with an embodiment.

FIG. 16 is a flow chart illustrating a LID routed VSMP packet, in accordance with an embodiment.

At step 1601, in accordance with an embodiment, within subnet A, an entity, such as a subnet manager of subnet A can request, via a LID routed VSMP, connectivity information. The destination of the LID routed VSMP can be a router within subnet A, such as router 1.

At step 1602, the LID routed VSMP can arrive at router 1. Router 1, in an embodiment and as described above, can be contained in a switch, such as switch 1. The LID routed VSMP can be passed to the SMA of switch 1 for verification.

At step 1603, in accordance with an embodiment, the SMA can modify the DR routed VSMP. The modification can include adding a single hop DR routed path to the end of the address, extending the hop counter (for the hop across the physical link to the second subnet), and setting the second receiver flag.

At step 1604, in accordance with an embodiment, the SMI (the SMI being associated with the SMA of the switch/router) can update the hop pointer of the VSMP.

At step 1605, in accordance with an embodiment, the SMI can forward the originally LID routed VSMP across the subnet boundary between subnet A 1620 and subnet B 1630, on a physical link, where a first end of the physical link can be connected to the router within subnet A, and the second end of the physical link can be connected to a router within subnet B.

At step 1606, in accordance with an embodiment, SMA' of the router 2 within subnet B 1630 can receive the now DR routed VSMP from the physical link.

At step 1607, in accordance with an embodiment, SMI' (associated with SMA') can validate the VSMP request.

In accordance with an embodiment, for a response flow, the SMA at router 2 can validate the VSMP. The validation can include checking input port relative to flag settings. If remote flag and both first and second receive flags are set, then the packet can be received on the physical port (i.e., from the external link side of the port configured with the virtual router). If remote and only the first receiver flag are set, then the packet can arrive on the virtual ink (i.e., from the internal switch side of the virtual router port). If the validation fails, then the status can be set to an appropriate error message.

In accordance with an embodiment, the SMA' at router 2 can complete the SMP response and set a direction attribute indicating a response. Such an exemplary configuration is shown here:

MADHdr.Method=0x81 (GetResp)
MADHdr.Direction=1 (indicating response)
LRH.SLID=0xffff
LRH.DLID=ReqMAD.MADHdr.SLID=0xffff The SMI' at router 2 can then decrement the hop pointer and forward the response out on the physical link, back to router 1. The SMA at router 1 can then revert the modifications performed on the original request, before forwarding the response out of the physical switch port back to the source. An exemplary configuration after such reversal is here:
MADHdr.Class=0x01
LRH.DLID=MADHdr.DrSLID (i.e. contains LID A from the original requester)
LRH.SLID=local LID=B In accordance with an embodiment, the SMA can additionally clear the DR specific fields of the VSMP so that the response appears to be completely consistent with the original VSMP when the response arrives at the original requestor.

In accordance with an embodiment, once the response arrives back at the source, the source will see a normally router LID response, just as if it had been processed entirely at router 1.

Figure 17:
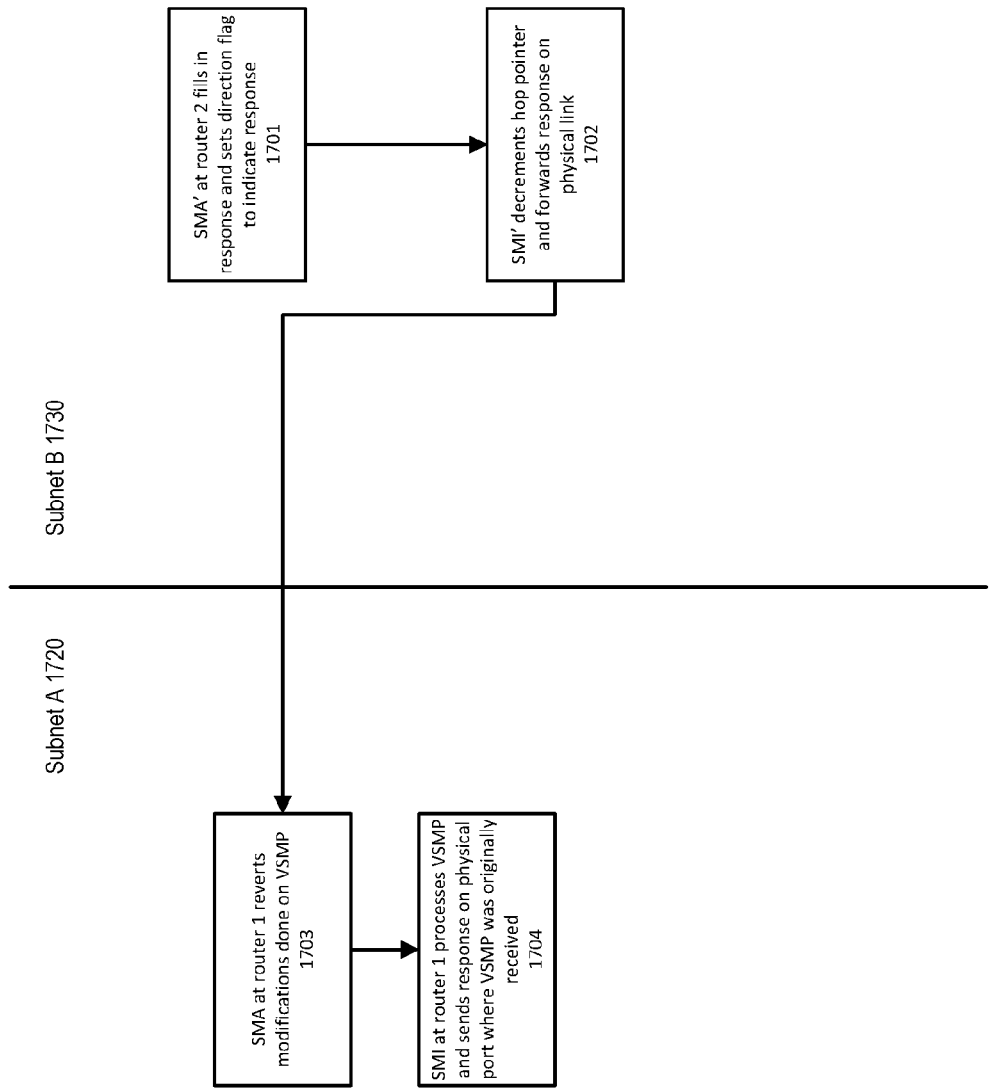
FIG. 17 is a flow chart illustrating a response to a LID routed VSMP packet, in accordance with an embodiment.

FIG. 17 is a flow chart illustrating a response to a LID routed VSMP packet, in accordance with an embodiment.

At step 1701, in accordance with an embodiment, SMA' of router 2 can fill in the responsive information to the VSMP (e.g., connectivity information), and set a directional flag in to indicate a response.

At step 1702, in accordance with an embodiment, SMI' can decrement the hop pointer of the response and forward the response back from subnet B 1730 to subnet A 1720 on, for example, a physical link having two ends. A first end of the physical link can be connected to the router within subnet A, and the second end of the physical link can be connected to a router within subnet B.

At step 1703, in accordance with an embodiment, the SMA at router 1 can received the response and revert the modifications done on the VSMP, including taking off the DR routed hop.

At step 1704, in accordance with an embodiment, the SMI at router 1 can process the response to the VSMP and send the LID routed response out on the physical switch port where the VSMP was originally received.

Inter Subnet Partitions

In accordance with an embodiment, certain partitions can be classified as "Inter Subnet Partitions" (also referred to herein as ISPs). When such certain partitions are thus classified, subnet management entities (e.g., SMs) can ensure that only properly classified partitions are allowed to be used for data traffic to remote subnets.

In accordance with an embodiment, a fabric manager can allocate a range of ISP P_Key values, and a global management entity, such as an Inter Subnet Manager (ISM) can implement and enforce this certain P_Key range within which all ISPs can reside (e.g., any ISP in such an environment must have a P_Key within the P_Key range as defined by the ISM). By ensuring that ISPs are allocated from a specific P_Key range, it is possible to ensure that some P_Key ranges can be used for different purposes by different subnets while P_Key ranges used for ISPs are used consistently by all relevant subnets.

In accordance with an embodiment, by observing which end-nodes are members of which ISPs and correlating this with what local router ports are members of the same ISPs, the set of possible inter subnet paths can be determined both within each local subnet as well as between connected subnets.

In accordance with an embodiment, by observing that directly connected router ports from different subnets are both members of the same set of ISPs, it can be determined that configuration is consistent in both subnets without exchanging additional information between the subnets.

Figure 18:
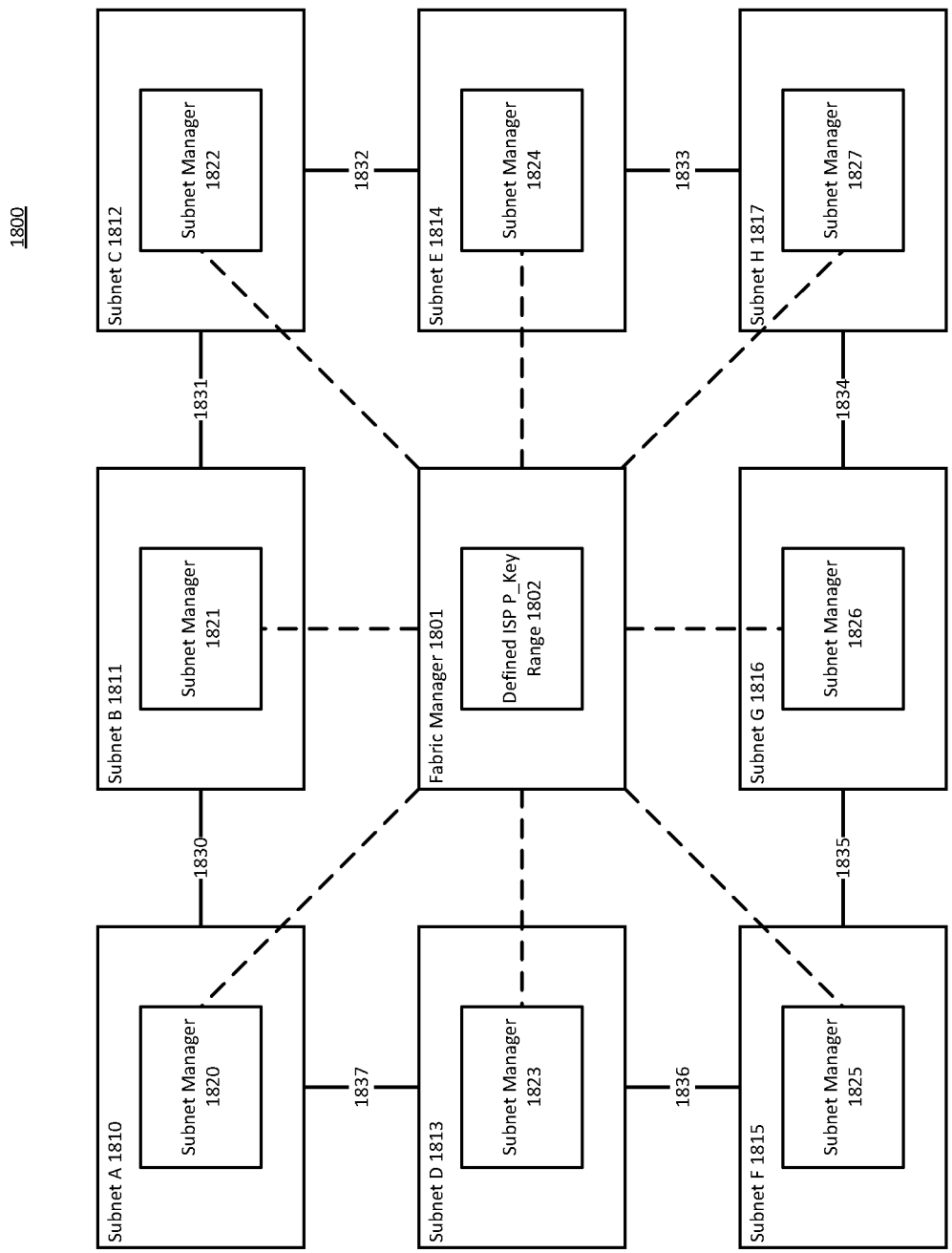
FIG. 18 is a block diagram showing a definition of an inter subnet partition P_Key range, in accordance with an embodiment.

FIG. 18 is a block diagram showing a definition of an inter subnet partition P_Key range, in accordance with an embodiment.

In accordance with an embodiment, within a network fabric 1800, such as an InfiniBand fabric, a fabric manager 1801, such as Oracle Fabric Manager. The fabric manager can explicitly create and define a number of inter subnet partitions, and can also set up the ISPs between subnets in order to allow data traffic. The fabric manager can ensure that ISPs are unique in the network fabric by allocating ISP P_Key values from a single configured range for the complete fabric. This defined ISP P_Key range 1802 can be communicated (shown with the dashed line in the Figure) to a number of subnets, such as subnet A-H 1810-1817.

In accordance with an embodiment, each of the subnets A-H can comprise an associated subnet manager 1820-1827. Each of the subnet managers can assign to a P_Key within the defined ISP P_Key range 1802 to router ports within each subnet manager's respective subnet.

In accordance with an embodiment, by assigning P_Keys within defined ISP P_Key range to router ports in the subnets, this can allow for inter subnet communication on, for example, links 1830-1837.

Figure 19:
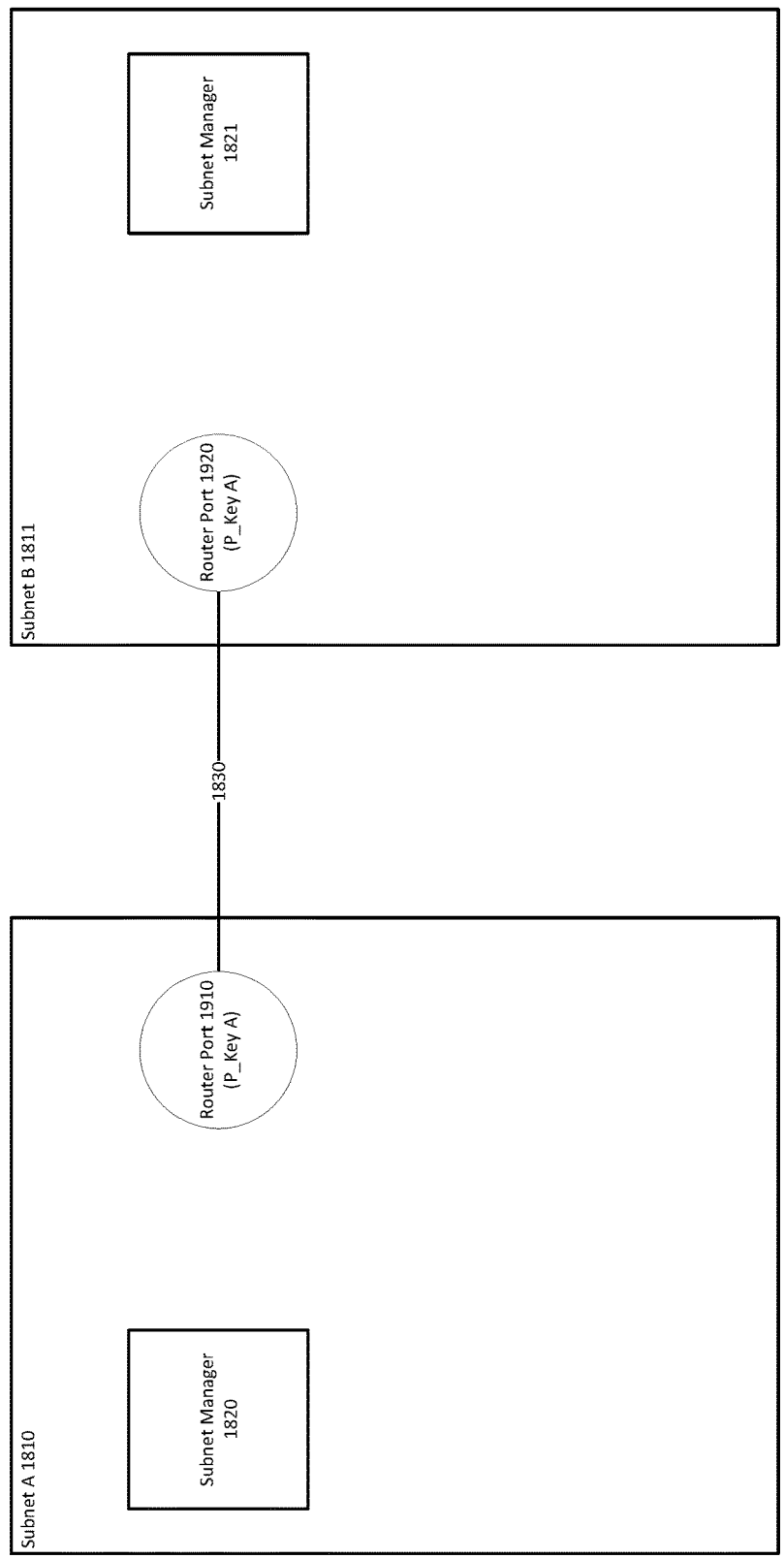
FIG. 19 is a block diagram of supporting inter subnet partitions, in accordance with an embodiment.

FIG. 19 is a block diagram of supporting inter subnet partitions, in accordance with an embodiment. In order to have data traffic between the two subnets, there has to be agreement on ISP (inter subnet partition)—a partition that should be common between the two subnets.

In accordance with an embodiment, after verifying that there exists connectivity between the two subnets (discussed above), the subnet manager 1820 in subnet A 1810 can assign a P_Key value (e.g., P_Key A) to router port 1910. Likewise, subnet manager 1821 can assign a P_Key value (e.g., P_Key A) to router port 1920. P_Key A can be within the range of ISP P_Key values as defined by the fabric manager, and distributed to the subnets and subnet manager.

In accordance with an embodiment, by assigning a P_Key value to each of the router ports that falls within the defined ISP P_Key range, the router ports 1910 and 1920 can communicate with each other across physical link 1830.

In accordance with an embodiment, management entities (i.e., ISMs) can exchange information with management entities in other subnets regarding what ISPs (e.g., P_Key values) exist, and exchange information on what nodes should be allowed to communicate/accessible.

In accordance with an embodiment, although not depicted in the figure, router ports 1910 and 1920 can be configured as a dual port virtual router, as described above.

Figure 20:
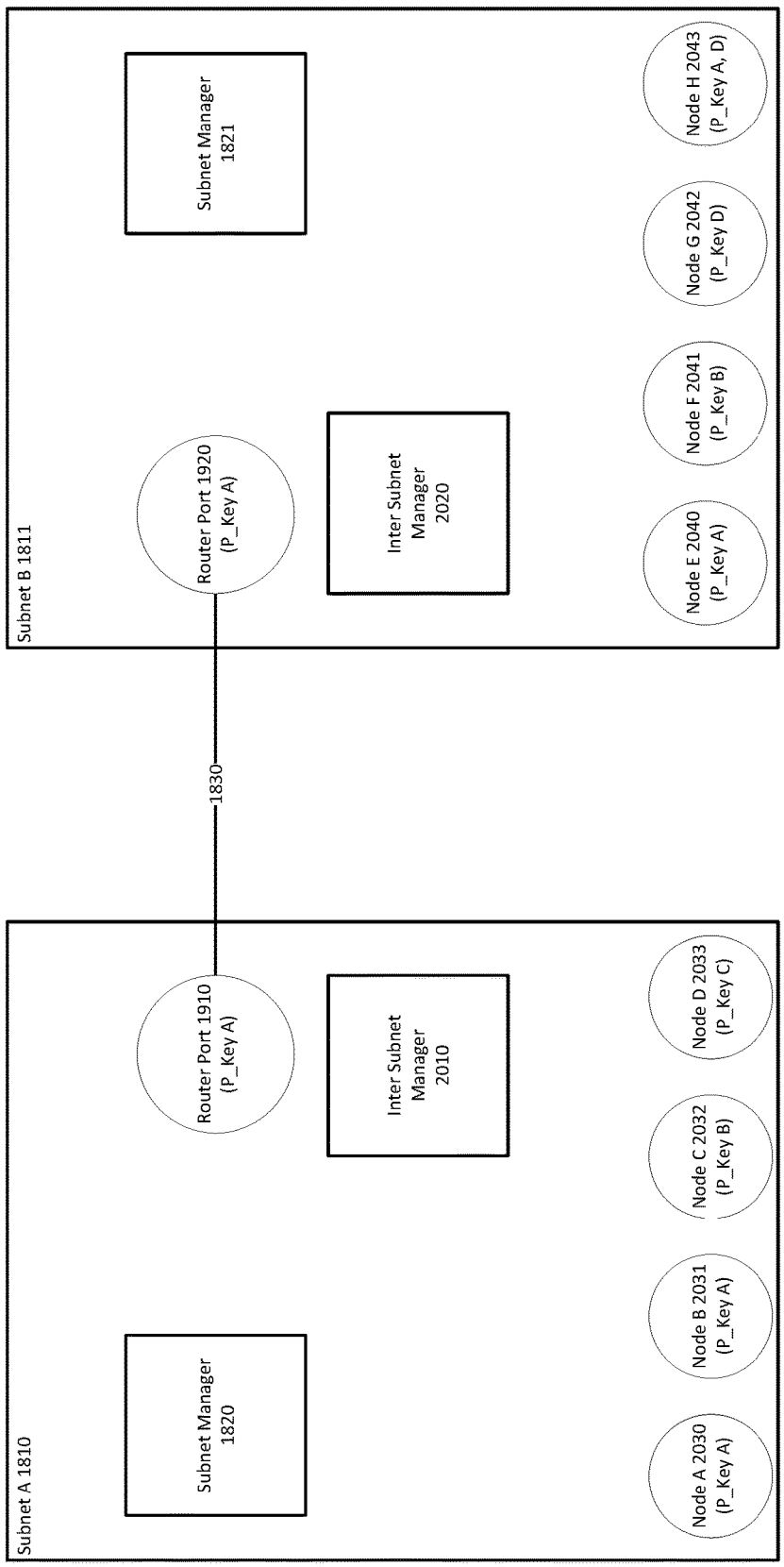
FIG. 20 is a block diagram of supporting inter subnet partitions, in accordance with an embodiment.

FIG. 20 is a block diagram of supporting inter subnet partitions, in accordance with an embodiment. After establishing communication and agreeing on ISP between subnets, the inter subnet manager 2010 in subnet A 1810 can inform inter subnet manager 2020 within subnet B 1811 about the nodes contained in subnet A 1810, and which partitions each node belongs to. However, only information about nodes sharing ISP membership that is also shared by router ports connecting the subnets needs to be exchanged. Put differently, in situations where only a small part of the total end nodes (virtual and/or physical) within a subnet are members of an ISP that allows them to communicate with nodes in a specific remote subnet, it would be wasteful to exchange information about all nodes in each subnet. Also, from a security perspective, limiting the exchange of information about end nodes to a strictly "need to know" basis between the involved subnets/ISMs is desired. This is in particular the case when the two connected subnets are managed by different Fabric Managers and also different admins at the fabric level. This can allow inter subnet communication between nodes of different subnets, so long as the partitions agree and are within the defined ISP range.

In accordance with an embodiment, for example, ISM 2010 can inform ISM 2020 that subnet A comprises node A 2030 and node B 2031, and that these nodes are members of ISP partition with P_Key A.

In accordance with an embodiment, ISM 2020 can inform ISM 2010 that subnet B comprises node E 2040 and node H 2043, and that these are members of ISP partition with P_Key A (although node H additionally comprises P_Key D). Note that partition with P_Key B, while not contained in the defined ISP range, can still exist in both subnets.

In accordance with an embodiment, the connectivity is controlled by an ISM within each subnet, meaning that there is no central management that configures each side that controls everything. Management entities (e.g., subnet managers) within each subnet, or on each side of an inter subnet connection, is responsible for setting up ISP membership, and then the corresponding ISMs are responsible for exchanging related information.

In accordance with an embodiment, in addition to the static P_Key distribution discussed above, systems and methods can additionally support dynamic P_Key distribution. For example, in looking at FIG. 20, SMs can continue to exchange information regarding the partitions and P_Keys each end node is part of. If, for example, subnet manager 1820 determines that node A 2030 is no longer part of ISP partition with P_Key A, then ISM 2010 can then communicate to ISM 2020 that node A is no longer part of ISP partition and can no longer take part in inter subnet communication. The manipulation of routing, address mapping hardware takes place locally in each subnet.

In accordance with an embodiment, although not depicted in the figure, router ports 1910 and 1920 can be configured as a dual port virtual router, as described above.

Figure 21:
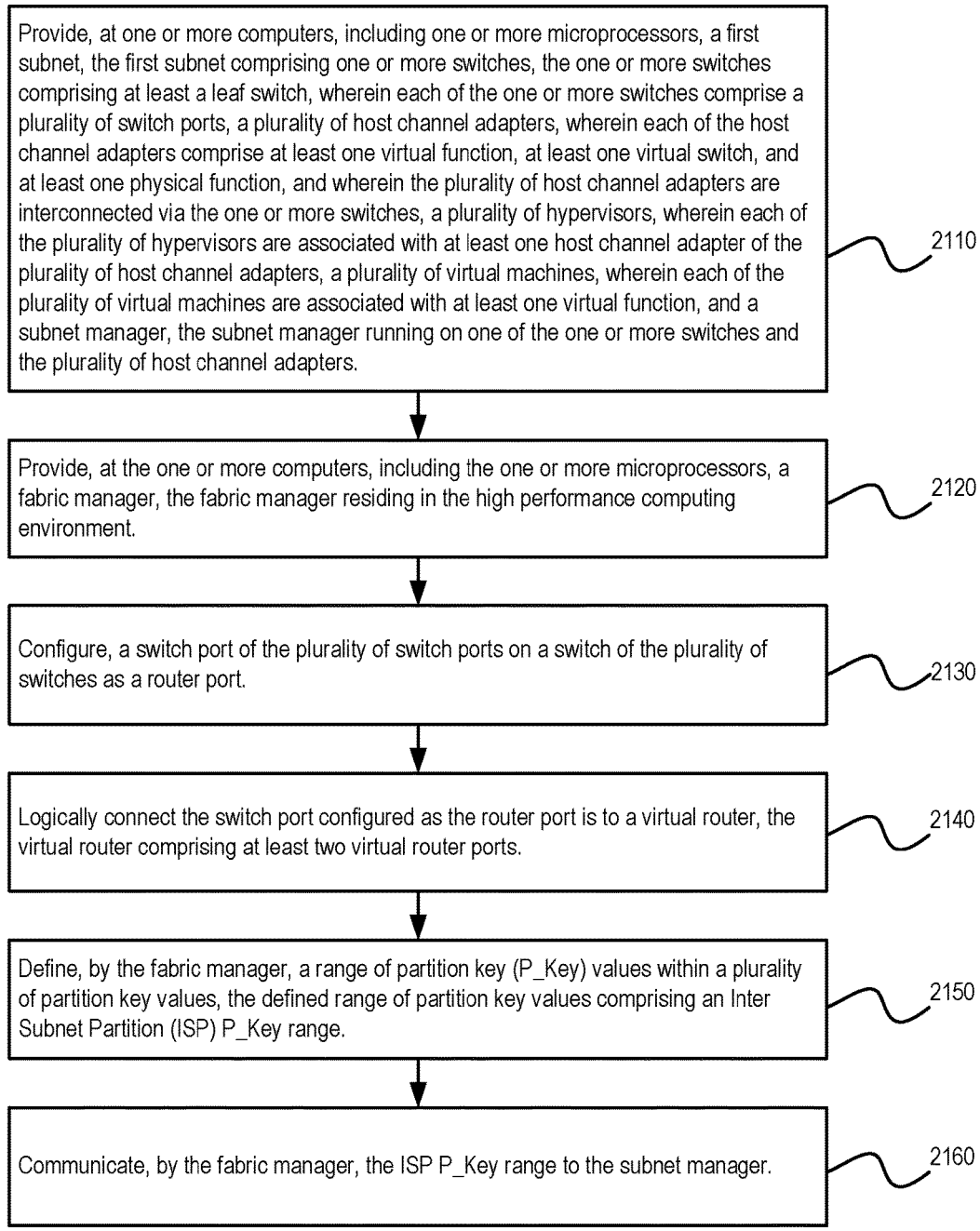
FIG. 21 is a flow chart of an exemplary method for supporting inter subnet partitions, in accordance with an embodiment.

FIG. 21 is a flow chart of an exemplary method for supporting inter subnet partitions, in accordance with an embodiment.

At step 2110, the method can provide, at one or more computers, including one or more microprocessors, a first subnet, the first subnet comprising a plurality of switches, the plurality of switches comprising at least a leaf switch, wherein each of the plurality of switches comprise a plurality of switch ports, a plurality of host channel adapters, each host channel adapter comprising at least one host channel adapter port, a plurality of end nodes, wherein each of the end nodes are associated with at least one host channel adapter of the plurality of host channel adapters, a subnet manager, the subnet manager running on one of the plurality of switches and the plurality of host channel adapters, and an inter subnet manager, the inter subnet manager running on one of the plurality of switches and the plurality of host channel adapters.

At step 2120, the method can provide, at the one or more computers, including the one or more microprocessors, a fabric manager, the fabric manager residing in the high performance computing environment.

At step 2130, the method can configure, a switch port of the plurality of switch ports on a switch of the plurality of switches as a router port.

At step 2140, the method can logically connect the switch port configured as the router port is to a virtual router, the virtual router comprising at least two virtual router ports.

At step 2150, the method can define, by the fabric manager, a range of partition key (P_Key) values within a plurality of partition key values, the defined range of partition key values comprising an Inter Subnet Partition (ISP) P_Key range.

At step 2160, the method can communicate, by the fabric manager, the ISP P_Key range to the subnet manager.

Features of the present invention can be implemented in, using, or with the assistance of a computer program product which is a storage medium (media) or computer readable medium (media) having instructions stored thereon/in which can be used to program a processing system to perform any of the features presented herein. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

Stored on any one of the machine readable medium (media), features of the present invention can be incorporated in software and/or firmware for controlling the hardware of a processing system, and for enabling a processing system to interact with other mechanism utilizing the results of the present invention. Such software or firmware may include, but is not limited to, application code, device drivers, operating systems and execution environments/containers.

Features of the invention may also be implemented in hardware using, for example, hardware components such as application specific integrated circuits (ASICs). Implementation of the hardware state machine so as to perform the functions described herein will be apparent to persons skilled in the relevant art.

Additionally, the present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

While various embodiments of the present invention have been described above, it should be understood that they have been presented by way of example, and not limitation. It will be apparent to persons skilled in the relevant art that various changes in form and detail can be made therein without departing from the spirit and scope of the invention.

The present invention has been described above with the aid of functional building blocks illustrating the performance of specified functions and relationships thereof. The boundaries of these functional building blocks have often been arbitrarily defined herein for the convenience of the description. Alternate boundaries can be defined so long as the specified functions and relationships thereof are appropriately performed. Any such alternate boundaries are thus within the scope and spirit of the invention.

The foregoing description of the present invention has been provided for the purposes of illustration and description. It is not intended to be exhaustive or to limit the invention to the precise forms disclosed. The breadth and scope of the present invention should not be limited by any of the above-described exemplary embodiments. Many modifications and variations will be apparent to the practitioner skilled in the art. The modifications and variations include any relevant combination of the disclosed features. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalents.

What is claimed is:

1. A system for supporting inter subnet partitions in a high performance computing environment, comprising:
one or more microprocessors;
a first subnet, the first subnet comprising
a plurality of switches, the plurality of switches comprising at least a leaf switch, wherein each of the plurality of switches comprise a plurality of switch ports,
a plurality of host channel adapters, each host channel adapter comprising at least one host channel adapter port,
a plurality of end nodes, wherein each of the end nodes are associated with at least one host channel adapter of the plurality of host channel adapters,
a subnet manager, the subnet manager running on one of the plurality of switches and the plurality of host channel adapters, and
an inter subnet manager, the inter subnet manager running on one of the plurality of switches and the plurality of host channel adapters;
a second subnet, the second subnet comprising
a plurality of switches of the second subnet, the plurality of switches of the second subnet comprising at least a leaf switch of the second subnet, wherein each of the plurality of switches of the second subnet comprise a plurality of switch ports of the second subnet,
a plurality of host channel adapters of the second subnet, each host channel adapter of the second subnet comprising at least one host channel adapter port of the second subnet,
a plurality of end nodes of the second subnet, wherein each of the end nodes of the second subnet are associated with at least one host channel adapter of the second subnet of the plurality of host channel adapters of the second subnet,
a subnet manager of the second subnet, the subnet manager of the second subnet running on one of the plurality of switches of the second subnet and the plurality of host channel adapters of the second subnet, and
an inter subnet manager of the second subnet, the inter subnet manager of the second subnet running on one of the plurality of switches of the second subnet and the plurality of host channel adapters of the second subnet; and
a fabric manager, the fabric manager residing in the high performance computing environment;

wherein a switch port of the plurality of switch ports on a switch of the plurality of switches is configured as a router port and is logically connected to a virtual router;
wherein the fabric manager defines a range of partition key (P_Key) values within a plurality of partition key values, the defined range of partition key values comprising an Inter Subnet Partition (ISP) P_Key range;
wherein the fabric manager communicates to the subnet manager the ISP P_Key range;
wherein a switch port of the second subnet of the plurality of switch ports of the second subnet on a switch of the another plurality of switches of the second subnet is configured as a router port of the second subnet and is logically connected to a virtual router of the second subnet;
wherein the first subnet is interconnected with the second subnet via a physical link;
wherein the fabric manager communicates to the subnet manager of the second subnet the ISP P_Key range;
wherein the subnet manager assigns a first P_Key within the ISP P_Key range to the switch port configured as the router port;
wherein the subnet manager of the second subnet assigns a second P_Key within the ISP P_Key range to the switch port of the second subnet configured as the router port of the second subnet;
wherein the inter subnet manager exchanges information with the inter subnet manager of the second subnet, over the physical link, the information comprising the first P_Key assigned to the router port; and
wherein the inter subnet manager of the second subnet exchanges information about the second subnet with the inter subnet manager, over the physical link, the information about the second subnet comprising the second P_Key assigned to the router port of the second subnet.

2. The system of claim 1, wherein upon the exchange of the information by the subnet manager of the second subnet, the subnet manager determines that the P_Key assigned to the router port and the second P_Key assigned to the router port of the second subnet are the same.

3. The system of claim 2, wherein upon determining that the P_Key assigned to the router port and the second P_Key assigned to the router port of the second subnet are the same, the inter subnet manager enables data communication with the second subnet through the router port of the second subnet.

4. A method for supporting inter subnet partitions in a high performance computing environment, comprising:
providing, at one or more computers, including one or more microprocessors,
a first subnet, the first subnet comprising
a plurality of switches, the plurality of switches comprising at least a leaf switch, wherein each of the plurality of switches comprise a plurality of switch ports,
a plurality of host channel adapters, each host channel adapter comprising at least one host channel adapter port,
a plurality of end nodes, wherein each of the end nodes are associated with at least one host channel adapter of the plurality of host channel adapters,
a subnet manager, the subnet manager running on one of the plurality of switches and the plurality of host channel adapters, and
an inter subnet manager, the inter subnet manager running on one of the plurality of switches and the plurality of host channel adapters, and
a second subnet, the second subnet comprising
a plurality of switches of the second subnet, the plurality of switches of the second subnet comprising at least a leaf switch of the second subnet, wherein each of the plurality of switches of the second subnet comprise a plurality of switch ports of the second subnet,
a plurality of host channel adapters of the second subnet, each host channel adapter of the second subnet comprising at least one host channel adapter port of the second subnet,
a plurality of end nodes of the second subnet, wherein each of the end nodes of the second subnet are associated with at least one host channel adapter of the second subnet of the plurality of host channel adapters of the second subnet,
a subnet manager of the second subnet, the subnet manager of the second subnet running on one of the plurality of switches of the second subnet and the plurality of host channel adapters of the second subnet, and
an inter subnet manager of the second subnet, the inter subnet manager of the second subnet running on one of the plurality of switches of the second subnet and the plurality of host channel adapters of the second subnet; and
providing a fabric manager, the fabric manager residing in the high performance computing environment;
configuring a switch port of the plurality of switch ports on a switch of the plurality of switches as a router port, the router port being logically connected to a virtual router;
logically connecting the switch port configured as the router port is to a virtual router, the virtual router comprising at least two virtual router ports;
defining, by the fabric manager, a range of partition key (P_Key) values within a plurality of partition key values, the defined range of partition key values comprising an Inter Subnet Partition (ISP) P_Key range;
communicating, by the fabric manager, the ISP P_Key range to the subnet manager;
configuring a switch port of the second subnet of the plurality of switch ports of the second subnet on a switch of the plurality of switches of the second subnet as a router port of the second subnet, the router port of the second subnet being connected to a virtual router of the second subnet;
interconnecting the first subnet with the second subnet via a physical link;
communicating, by the fabric manager, the ISP P_Key range to the subnet manager of the second subnet;
assigning, by the subnet manager, a first P_Key within the ISP P_Key range to the switch port configured as the router port;
assigning, by the subnet manager of the second subnet, assigns a second P_Key within the ISP P_Key range to the switch port of the second subnet configured as the router port of the second subnet;
exchanging, by the inter subnet manager, information with the inter subnet manager of the second subnet, over the physical link, the information comprising the first P_Key assigned to the router port; and
exchanging, by the inter subnet manager of the second subnet, information about the second subnet with the inter subnet manager, over the physical link, the information about the second subnet comprising the second P_Key assigned to the router port of the second subnet.

5. The method of claim 4, further comprising:
upon the exchange of the information by the inter subnet manager of the second subnet, determining by the subnet manager that the P_Key assigned to the router port and the second P_Key assigned to the router port of the second subnet are the same.

6. The method of claim 5, further comprising:
upon determining that the P_Key assigned to the router port and the second P_Key assigned to the router port of the second subnet are the same, enabling, by the subnet manager, data communication with the second subnet through the router port of the second subnet.

7. A non-transitory computer readable storage medium, including instructions stored thereon for supporting inter subnet partitions in a high performance computing environment, which when read and executed by one or more computers cause the one or more computers to perform steps comprising:
providing, at one or more computers, including one or more microprocessors,
a first subnet, the first subnet comprising
a plurality of switches, the plurality of switches comprising at least a leaf switch, wherein each of the plurality of switches comprise a plurality of switch ports,
a plurality of host channel adapters, each host channel adapter comprising at least one host channel adapter port,
a plurality of end nodes, wherein each of the end nodes are associated with at least one host channel adapter of the plurality of host channel adapters,
a subnet manager, the subnet manager running on one of the plurality of switches and the plurality of host channel adapters, and
an inter subnet manager, the inter subnet manager running on one of the plurality of switches and the plurality of host channel adapters, and
a second subnet, the second subnet comprising
a plurality of switches of the second subnet, the plurality of switches of the second subnet comprising at least a leaf switch of the second subnet, wherein each of the plurality of switches of the second subnet comprise a plurality of switch ports of the second subnet,
a plurality of host channel adapters of the second subnet, each host channel adapter of the second subnet comprising at least one host channel adapter port of the second subnet,
a plurality of end nodes of the second subnet, wherein each of the end nodes of the second subnet are associated with at least one host channel adapter of the second subnet of the plurality of host channel adapters of the second subnet,
a subnet manager of the second subnet, the subnet manager of the second subnet running on one of the plurality of switches of the second subnet and the plurality of host channel adapters of the second subnet, and an inter subnet manager of the second subnet, the inter subnet manager of the second subnet running on one of the plurality of switches of the second subnet and the plurality of host channel adapters of the second subnet; and
providing a fabric manager, the fabric manager residing in the high performance computing environment;
configuring a switch port of the plurality of switch ports on a switch of the plurality of switches as a router port, the router port being logically connected to a virtual router;
logically connecting the switch port configured as the router port is to a virtual router, the virtual router comprising at least two virtual router ports;
defining, by the fabric manager, a range of partition key (P_Key) values within a plurality of partition key values, the defined range of partition key values comprising an Inter Subnet Partition (ISP) P_Key range;
communicating, by the fabric manager, the ISP P_Key range to the subnet manager;
configuring a switch port of the second subnet of the plurality of switch ports of the second subnet on a switch of the plurality of switches of the second subnet as a router port of the second subnet, the router port of the second subnet being connected to a virtual router of the second subnet;
interconnecting the first subnet with the second subnet via a physical link;
communicating, by the fabric manager, the ISP P_Key range to the subnet manager of the second subnet;
assigning, by the subnet manager, a first P_Key within the ISP P_Key range to the switch port configured as the router port;
assigning, by the subnet manager of the second subnet, assigns a second P_Key within the ISP P_Key range to the switch port of the second subnet configured as the router port of the second subnet;
exchanging, by the inter subnet manager, information with the inter subnet manager of the second subnet, over the physical link, the information comprising the first P_Key assigned to the router port; and
exchanging, by the inter subnet manager of the second subnet, information about the second subnet with the inter subnet manager, over the physical link, the information about the second subnet comprising the second P_Key assigned to the router port of the second subnet.

8. The non-transitory computer readable storage medium of claim 7, the steps further comprising:
upon the exchange of the information by the inter subnet manager of the second subnet, determining by the subnet manager that the P_Key assigned to the router port and the second P_Key assigned to the router port of the second subnet are the same; and
upon determining that the P_Key assigned to the router port and the second P_Key assigned to the router port of the second subnet are the same, enabling, by the subnet manager, data communication with the second subnet through the router port of the second subnet.

* * * * *

UNITED STATES PATENT AND TRADEMARK OFFICE
CERTIFICATE OF CORRECTION

PATENT NO. : 10,178,027 B2
APPLICATION NO. : 15/413152
DATED : January 8, 2019
INVENTOR(S) : Johnsen et al.

Page 1 of 1

It is certified that error appears in the above-identified patent and that said Letters Patent is hereby corrected as shown below:

In the Specification

In Column 2, Line 24, after "embodiment" insert -- . --.

In Column 3, Line 35, delete "inifinibandta" and insert -- infinibandta --, therefor.

In Column 12, Line 14, after "PF" insert -- . --.

In Column 17, Line 62, delete "InifiniBand" and insert -- InfiniBand --, therefor.

Signed and Sealed this
Seventh Day of January, 2020

Andrei Iancu
*Director of the United States Patent and Trademark Office*